US011062003B2

(12) United States Patent
Chang et al.

(10) Patent No.: US 11,062,003 B2
(45) Date of Patent: Jul. 13, 2021

(54) METHOD FOR ADAPTIVE AUTHENTICATION AND ELECTRONIC DEVICE SUPPORTING THE SAME

(71) Applicant: Samsung Electronics Co., Ltd., Gyeonggi-do (KR)

(72) Inventors: Moon Soo Chang, Gyeonggi-do (KR); Joo Yeon Lee, Seoul (KR); Chang Yul Lee, Gyeonggi-do (KR); Ji Yoon Park, Gyeonggi-do (KR); Jong Hoon Won, Gyeonggi-do (KR); Seung Eun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 15/935,352

(22) Filed: Mar. 26, 2018

(65) Prior Publication Data
US 2018/0285544 A1    Oct. 4, 2018

(30) Foreign Application Priority Data

Mar. 28, 2017    (KR) .......................... 10-2017-0039557

(51) Int. Cl.
*G06F 21/32*    (2013.01)
*G06F 21/34*    (2013.01)

(52) U.S. Cl.
CPC ............. *G06F 21/32* (2013.01); *G06F 21/34* (2013.01); *G06F 2221/2111* (2013.01); *G06F 2221/2113* (2013.01)

(58) Field of Classification Search
CPC .. G06F 21/32; G06F 21/34; G06F 2221/2113; G06F 21/31; H04W 12/06;
(Continued)

(56) References Cited

U.S. PATENT DOCUMENTS 7,602,942 B2 *  10/2009  Bazakos ............ G06K 9/00255
                                                    209/577
7,623,970 B2    11/2009  Kondo et al.
(Continued)

FOREIGN PATENT DOCUMENTS

JP    2011-192154 A    9/2011
KR    2002-0081121 A    10/2002
(Continued)

OTHER PUBLICATIONS

International Search Report dated Jul. 9, 2018.
(Continued)

*Primary Examiner* — Shanto Abedin
(74) *Attorney, Agent, or Firm* — Cha & Reiter, LLC

(57) ABSTRACT

An electronic device and method are disclosed herein. An electronic device includes one or more biometric sensors, a memory configured to store an authentication setting table associated with one or more authentication methods associated with one or more authentication levels, and a processor operatively connected to the memory and the one or more biometric sensors. The processor implements the method, including: receive authentication level information associated with a function executed by the electronic device, select at least one authentication method of the one or more authentication methods matching an authentication level indicated by the received authentication level information, and perform user authentication based on the selected at least one authentication method through the one or more biometric sensors.

22 Claims, 16 Drawing Sheets

(58) Field of Classification Search
CPC . H04W 12/08; G06Q 20/322; G06Q 20/3224; G06K 9/2054; G06K 9/00255
See application file for complete search history.

(56) References Cited

U.S. PATENT DOCUMENTS

| | | | |
|---|---|---|---|
| 8,381,985 B2 | 2/2013 | Ferren et al. | |
| 8,439,265 B2 | 5/2013 | Ferren et al. | |
| 8,700,012 B2 | 4/2014 | Ferren et al. | |
| 8,700,102 B2 | 4/2014 | Ferren et al. | |
| 8,820,644 B2 | 9/2014 | Ferren et al. | |
| 8,863,243 B1* | 10/2014 | Lidzborski | H04W 12/06 726/4 |
| 8,904,164 B2 | 12/2014 | Ferren | |
| 8,909,915 B2 | 12/2014 | Ferren | |
| 8,943,581 B2 | 1/2015 | Ferren | |
| 9,100,825 B2* | 8/2015 | Schultz | H04W 12/06 |
| 9,134,804 B2 | 9/2015 | Ferren | |
| 9,134,805 B2 | 9/2015 | Ferren et al. | |
| 9,141,199 B2 | 9/2015 | Ferren et al. | |
| 9,171,141 B2 | 10/2015 | Ferren | |
| 9,195,816 B2 | 11/2015 | Ferren et al. | |
| 9,195,818 B2 | 11/2015 | Ferren | |
| 9,330,322 B2 | 5/2016 | Ferren | |
| 9,349,035 B1* | 5/2016 | Gerber | G06K 9/00013 |
| 9,378,501 B2 | 6/2016 | Ferren | |
| 9,690,480 B2 | 6/2017 | Ferren | |
| 9,778,842 B2 | 10/2017 | Ferren | |
| 9,848,113 B2* | 12/2017 | Smits | G06K 9/228 |
| 9,851,897 B2 | 12/2017 | Ferren | |
| 10,032,008 B2 | 7/2018 | Griffiths et al. | |
| 10,049,361 B2* | 8/2018 | Kuntagod | G06Q 20/3224 |
| 10,275,585 B2* | 4/2019 | Fadell | H04W 12/0605 |
| 2002/0152034 A1 | 10/2002 | Kondo et al. | |
| 2010/0128937 A1 | 5/2010 | Yoo et al. | |
| 2010/0162386 A1* | 6/2010 | Li | G06F 21/32 726/19 |
| 2012/0074227 A1 | 3/2012 | Ferren et al. | |
| 2012/0075452 A1* | 3/2012 | Ferren | G06F 3/04883 348/78 |
| 2012/0079265 A1 | 3/2012 | Ferren | |
| 2012/0118971 A1 | 5/2012 | Ferren | |
| 2012/0118972 A1 | 5/2012 | Ferren et al. | |
| 2012/0118973 A1 | 5/2012 | Ferren et al. | |
| 2012/0120301 A1 | 5/2012 | Ferren et al. | |
| 2012/0157127 A1 | 6/2012 | Ferren et al. | |
| 2012/0190408 A1 | 7/2012 | Ferren et al. | |
| 2012/0268405 A1 | 10/2012 | Ferren et al. | |
| 2012/0268581 A1 | 10/2012 | Ferren | |
| 2012/0270575 A1 | 10/2012 | Ferren et al. | |
| 2012/0270601 A1 | 10/2012 | Ferren et al. | |
| 2012/0272313 A1* | 10/2012 | Ferren | G06F 3/02 726/19 |
| 2012/0276932 A1 | 11/2012 | Ferren et al. | |
| 2013/0019321 A1 | 1/2013 | Ferren | |
| 2013/0159195 A1* | 6/2013 | Kirillin | G06Q 20/322 705/71 |
| 2013/0227651 A1* | 8/2013 | Schultz | G06F 21/32 726/4 |
| 2013/0251215 A1* | 9/2013 | Coons | H04N 5/23219 382/118 |
| 2013/0267204 A1* | 10/2013 | Schultz | G06F 21/32 455/411 |
| 2014/0099005 A1* | 4/2014 | Mogi | G06K 9/00288 382/118 |
| 2014/0109200 A1* | 4/2014 | Tootill | G06F 21/32 726/5 |
| 2014/0157209 A1 | 6/2014 | Dalal et al. | |
| 2014/0247221 A1 | 9/2014 | Ferren | |
| 2014/0247222 A1 | 9/2014 | Ferren | |
| 2014/0337948 A1* | 11/2014 | Hoyos | H04W 12/06 726/7 |
| 2014/0362228 A1* | 12/2014 | McCloskey | G07D 7/1205 348/164 |
| 2015/0150121 A1 | 5/2015 | Ferren | |
| 2015/0227790 A1* | 8/2015 | Smits | G06K 9/00604 348/78 |
| 2015/0242601 A1 | 8/2015 | Griffiths et al. | |
| 2015/0242605 A1* | 8/2015 | Du | G06F 21/31 726/7 |
| 2015/0242840 A1* | 8/2015 | Kursun | G06Q 20/3224 705/44 |
| 2015/0310259 A1* | 10/2015 | Lau | G06K 9/00288 382/118 |
| 2015/0310444 A1* | 10/2015 | Chen | G06Q 20/4016 705/44 |
| 2015/0350207 A1* | 12/2015 | Kim | H04L 63/105 713/170 |
| 2016/0026884 A1 | 1/2016 | Ferren | |
| 2016/0034901 A1* | 2/2016 | Ferren | G06K 9/00335 705/44 |
| 2016/0065572 A1 | 3/2016 | Kim et al. | |
| 2016/0071111 A1* | 3/2016 | Wang | G06Q 30/0643 705/44 |
| 2016/0087952 A1* | 3/2016 | Tartz | G06F 21/40 455/411 |
| 2016/0142532 A1* | 5/2016 | Bostick | H04W 12/08 455/411 |
| 2016/0191594 A1* | 6/2016 | Moustafa | H04L 65/604 709/203 |
| 2016/0370992 A1 | 12/2016 | Ferren | |
| 2017/0061210 A1* | 3/2017 | Ollila | H04N 1/00307 |
| 2017/0091550 A1* | 3/2017 | Feng | G06T 7/38 |
| 2017/0235482 A1 | 8/2017 | Ferren | |
| 2017/0372059 A1* | 12/2017 | Sindia | G06N 20/00 |

FOREIGN PATENT DOCUMENTS

| | | |
|---|---|---|
| KR | 10-2005-0066052 A | 6/2005 |
| KR | 10-2010-0057983 A | 6/2010 |
| KR | 10-2016-0005204 A | 1/2016 |
| WO | 2016/032206 A2 | 3/2016 |

OTHER PUBLICATIONS

Miranda, et al.; "Context-aware multi-factor authentication"; pp. 37-72; Repositorio Institucional da FCT-UNL, Sep. 24, 2010; XP055091109; http://hdl.handle.net/10362/4111.
European Search Report dated Nov. 26, 2019.

* cited by examiner

METHOD FOR ADAPTIVE AUTHENTICATION AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2017-0039557, filed on Mar. 28, 2017, in the Korean Intellectual Property Office, the disclosure of which is incorporated by reference herein its entirety.

TECHNICAL FIELD

The present disclosure relates to adaptive authentication execution according to at least one of an authentication level and an electronic device environment.

BACKGROUND

Presently, various types of portable electronic devices such as a smartphone, a tablet personal computer (PC), and the like has been widely distributed. The portable electronic devices support various authentication methods for implementing security functions.

The above information is presented as background information only to assist with an understanding of the present disclosure. No determination has been made, and no assertion is made, as to whether any of the above might be applicable as prior art with regard to the present disclosure.

SUMMARY

For example, a conventional portable electronic device provides a fingerprint sensor-based fingerprint authentication method, an iris sensor-based iris authentication method, or the like. In the meantime, if an authentication method is designated, since the conventional portable electronic device performs the specified authentication method regardless of a context in which the electronic device of a user is operated, or the state of the electronic device, the conventional portable electronic device may not perform the requested authentication or may have a high authentication failure rate, in a situation where it is difficult or impossible for the user to perform the corresponding authentication method.

Aspects of the present disclosure are to address at least the above-mentioned problems and/or disadvantages and to provide at least the advantages described below. Accordingly, an aspect of the present disclosure is to an adaptive authentication performing method that is capable of setting an authentication level and adaptively adjusting at least one authentication method associated with the set authentication level to be suitable for a user's electronic device usage environment, with regard to the execution of authentication of an electronic device, and an electronic device supporting the same.

Another aspect of the present disclosure is to an adaptive authentication performing method that is capable of selectively or complexly operating at least one authentication method of various authentication methods, depending on the usage environment of an electronic device, and an electronic device supporting the same.

In accordance with an aspect of the present disclosure, an electronic device is provided. The electronic device may include one or more biometric sensors, a memory configured to store an authentication setting table associated with one or more authentication methods associated with one or more authentication levels, and a processor operatively connected to the memory and the one or more biometric sensors, wherein the processor is configured to: receive authentication level information associated with a function executed by the electronic device, select at least one authentication method of the one or more authentication methods matching an authentication level indicated by the received authentication level information, and perform user authentication based on the selected at least one authentication method through the one or more biometric sensors.

In accordance with another aspect of the present disclosure, an adaptive authentication performing method is provided. The method may include storing in memory an authentication method setting table in which one or more authentication methods are associated with one or more authentication levels, receiving by a communication device authentication level information associated with a function executed by an electronic device, based on the authentication method setting table, selecting at least one authentication method from among the one or more authentication methods based on an authentication level indicated by the received authentication level information, and performing user authentication using the selected at least one authentication method through one or more biometric sensors of the electronic device.

As described above, various embodiments may selectively or complexly operate various authentication methods depending on an electronic device operating environment, the characteristic of a function being executed in electronic device, or a specified authentication level and thus may perform an authentication method suitable for a device usage environment or may easily perform the authentication method that a user desires, without being limited by the authentication method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
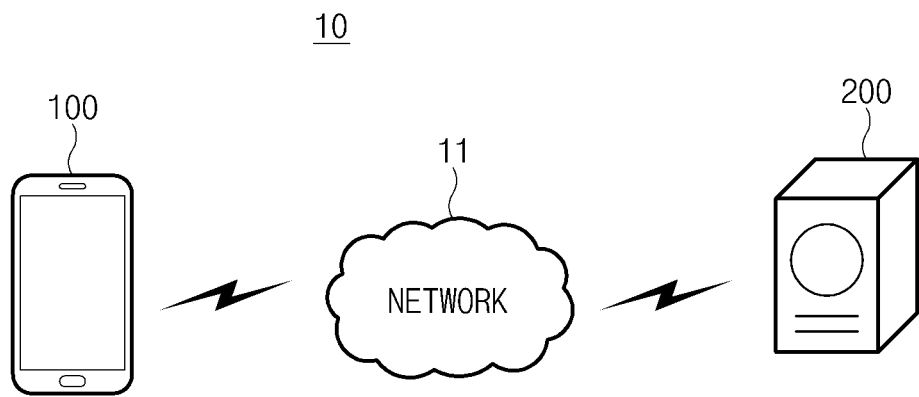
FIG. 1 is a view illustrating an example of an electronic device operating environment according to an embodiment of the present disclosure.

Various embodiments of the present disclosure may be described with reference to accompanying drawings. Accordingly, those of ordinary skill in the art will recognize that modification, equivalent, and/or alternative on the various embodiments described herein can be variously made without departing from the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may b e described with reference to the accompanying drawings. The term "user" used herein may refer to a person who uses an electronic device or may refer to a device (e.g., an artificial intelligence electronic device) that uses an electronic device.

FIG. 1 is a view illustrating an example of an electronic device operating environment according to an embodiment of the present disclosure.

Referring to FIG. 1, an electronic device operating environment 10 according to an embodiment of the present disclosure may include, for example, an electronic device 100, a network 11, and a server device 200.

The network 11 may establish a communication channel between the electronic device 100 and the server device 200 and may support the signal transmission/reception between the electronic device 100 and the server device 200. For example, the network 11 may support signal transmission/reception associated with authentication utilized, depending on the execution of the function of the electronic device 100. For example, the network 11 may establish the wireless/wired communication channel of the electronic device 100 and may establish a communication channel associated with the access to the server device 200. According to an embodiment, the network 11 may include a mobile communication network, for example, $3^{rd}$ Generation (3G), $4^{th}$ generation (4G), or the like, a short range communication network, or the like.

The server device 200 may establish a communication channel with the electronic device 100 through the network 11. The server device 200 may support a service associated with the execution of the function of at least one application operated by the electronic device 100. In this regard, the server device 200 may provide the electronic device 100 with specified virtual page information and may provide the electronic device 100 with specified authentication level information. The server device 200 may receive the execution result of at least one authentication method corresponding to the authentication level information, from the electronic device 100. The server device 200 may provide the electronic device 100 with information about a service depending on the received authentication result or may provide execution information of a function execution-requested by the electronic device 100.

According to various embodiments, authentication level information that the server device 200 provides to the electronic device 100 may be changed depending on a type of a function (or a service that the electronic device 100 requests) that the electronic device 100 executes or a type of the electronic device 100 (e.g., a type of an authentication method that the electronic device 100 or hardware is capable of supporting). Alternatively, the authentication level information may be changed depending on at least one of the current location of the electronic device 100 or information about time when the electronic device 100 is used, or the execution result of the previous authentication that has been performed by the electronic device 100. In this regard, in a procedure in which the electronic device 100 accesses the server device 200, the server device 200 may receive type information of an electronic device, user information, or the like, from the electronic device 100.

The electronic device 100 may establish a communication channel with the server device 200 through the network 11. According to an embodiment, the electronic device 100 may receive a virtual page (e.g., a financial service web page in the case where the server device 200 supports a financial service, a game service page in the case where the server device 200 supports a game or the like) from the server device 200 and may output the virtual page. The electronic device 100 may receive authentication level information associated with authentication execution, from the server device 200. The electronic device 100 may select at least one authentication method corresponding to the received authentication level information and may activate a hardware device associated with the selected authentication method. For example, in the case where the electronic device 100 receives relatively high authentication level information, the electronic device 100 may activate a hardware device (e.g., fingerprint sensor) corresponding to a rating that satisfies the corresponding authentication level. In this regard, the electronic device 100 may store and manage an authentication method setting table (e.g., recognizer operating information described below) recording types of authentication methods to be performed for each authentication level. The authentication method setting table may be received from the server device 200 and may be updated by the request of the server device 200 or user settings. The electronic device 100 may verify the authentication method setting table to select at least one authentication method of authentication methods to be performed depending on the utilized authentication level. In this operation, the electronic device 100 may select at least one authentication method depending on at least one of the current location of an electronic device, a time at a current location, an authentication history, or a type of a function being executed. The electronic device 100 may perform authentication according to the selected authentication method and may provide the authentication execution result to the server device 200.

According to various embodiments, the authentication level information may be obtained depending on the function execution of an application installed in the electronic device 100. For example, if an execution request of a specified game function, a function to access a specified security file, or the like occurs, an application associated with the game function or functions to access a security file may request user authentication for the execution of the corresponding function. In this operation, to request the execution of authentication according to the specified authentication level, the application may transmit specified authentication level information to a processor. Depending on the authentication level information that the application requests, the processor of the electronic device 100 may select at least one authentication method and may perform authentication according to the selected authentication method. If the authentication is successful, the processor of the electronic device 100 may execute the execution-requested function (e.g., the game function, the function to access a security file, or the like). In this regard, the electronic device 100 may include a normal processor capable of performing data processing associated with a normal environment and a secure processor capable of performing data processing associated with a secure environment. The secure processor may perform the procedure such as the verification of an authentication level, the selection of an authentication method, the execution of an authentication, or the like and may transmit the result to the normal processor.

According to various embodiments, in the case where the authentication level that the application requests conflicts with the authentication level that the server device 200 requests, the electronic device 100 may select an authentication level depending on a user input or a specified policy and may select the authentication method according to the selected authentication level. According to an embodiment, in the case where the requested authentication level is conflicted, the electronic device 100 may perform the authentication method according to the authentication level that the server device 200 requests. Alternatively, the electronic device 100 may select an authentication method according to an authentication level, which is relatively high, from among the authentication level that the application requests and the authentication level that the server device 200 requests and may perform the selected authentication method.

As described above, according to an embodiment of the present disclosure, if the authentication level information is received, the electronic device 100 may select at least one authentication method among authentication methods, which are relatively preferred depending on the current available authentication method or an authentication history, based on the received authentication level and the current state of the electronic device 100 and may perform authentication based on the selected authentication method. According to various embodiments, the electronic device 100 may output a list recording a type of at least one authentication method capable of being performed depending on the requested authentication level and may perform the authentication in the authentication method selected by a user input.

Figure 2:
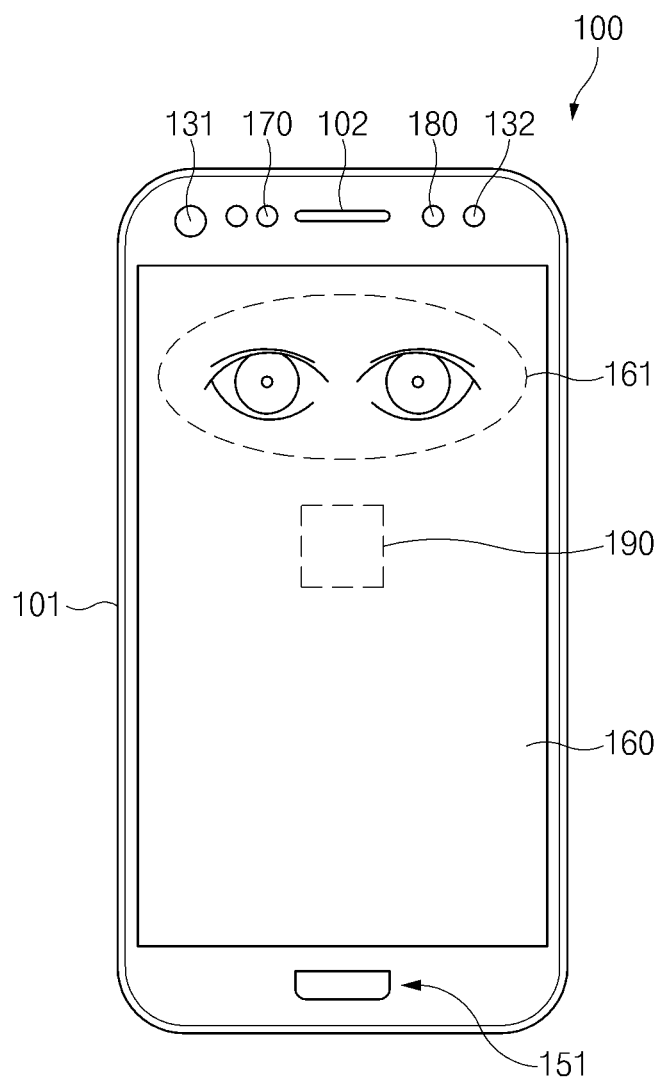
FIG. 2 is a view illustrating an example of an external appearance of an electronic device, according to an embodiment of the present disclosure.
Figure 3:
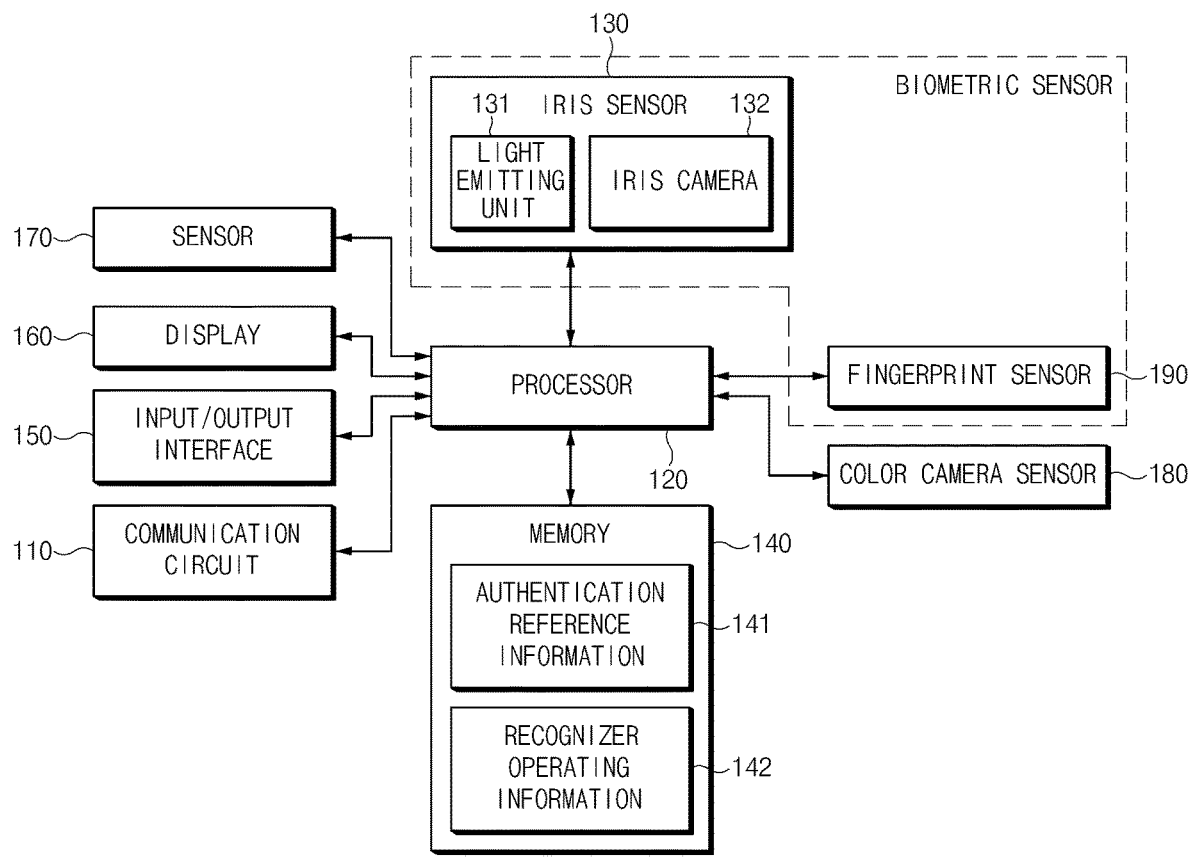
FIG. 3 is a block diagram illustrating an example of a configuration of an electronic device, according to an embodiment of the present disclosure.

FIG. 2 is a view illustrating an example of an external appearance of an electronic device, according to an embodiment of the present disclosure. FIG. 3 is a block diagram illustrating an example of a configuration of an electronic device, according to an embodiment of the present disclosure.

Referring to FIGS. 1 to 3, the electronic device 100 according to an embodiment of the present disclosure may further include a housing 101 and device elements (e.g., a display 160, a biometric sensor (e.g., an iris sensor 130 and a fingerprint sensor 190), a color camera sensor 180, an input/output interface 150, and a sensor 170) seated inside the housing 101, a processor 120, a memory 140, and a communication circuit 110. Additionally or alternatively, the electronic device 100 may further include a receiver 102 (or ear-speaker). According to various embodiments, in the case where the color camera sensor 180 is used for face authentication, the color camera sensor 180 may be included in the configuration of the biometric sensor on classification basis.

According to an embodiment, the electronic device 100 may further include a printed circuit board seated inside the housing 101, and the display 160, an image sensor (e.g., the iris sensor 130 and the color camera sensor 180 (or an RGB camera sensor)), the fingerprint sensor 190, the input/output interface 150, the sensor 170, the communication circuit 110, the processor 120, the memory 140, and the like may be mounted in the printed circuit board. According to various embodiments, the biometric sensor of the electronic device 100 may further include a biometric sensor, which is capable of measuring a heart rate pattern, a blood vessel pattern, or the like with regard to user authentication, or the like.

The housing 101 may include a first surface, a second surface opposite to the first surface, and at least one side area interposed between the first surface and the second surface. The first surface may be opened, and at least part of the display 160 may be exposed to the outside through the first surface. The upper portion of the side area of the housing 101 may surround an external appearance of the seated display 160, and a hole associated with the input/output interface 150 may be provided on at least one side of the front surface or the side area of the housing 101. According to various embodiments, a protective cover (e.g., cover glass) disposed on the uppermost layer of the display 160 may be included in a configuration of the housing 101. According to various embodiments, the periphery of the display 160 may be formed as a curved portion having a specified curvature, and in this case, the periphery of the display 160 may be disposed in at least part of the side area of the housing 101. A printed circuit board on which a processor associated with the driving the display 160 and a memory are mounted may be disposed inside the housing 101.

The input/output interface 150 may include at least one device configuration capable of generating a user input. For example, the input/output interface 150 may include a home key disposed on the first surface of the housing 101, at least one button key disposed in the side area of the housing 101, or the like. According to various embodiments, the input/output interface 150 may further include a microphone capable of collecting a user voice. The microphone may be used to collect utterance information with regard to voice fingerprint (e.g., audio fingerprint) authentication. For example, the input/output interface 150 may receive a user input associated with an operation of the iris sensor 130. In the case where the display 160 is provided in the form of a touch screen, the display 160 may be included in the input/output interface 150. According to various embodiments, the display 160 may further include a digitizer, or the like, and the display 160 may collect a user input according to the operation of a stylus pen, or the like.

Additionally or alternatively, the electronic device may further include a receiver 102 (or ear-speaker), a speaker, or the like that is associated with an audio output. The receiver 102 may be disposed on the first surface of the housing 101. For example, the speaker may be disposed on the side area of the housing 101 or the second surface (or the first surface) of the housing 101.

The display 160 may be disposed on at least part of the first surface of the housing 101. The display 160 may include a display area and a non-display area. For example, the display 160 may output a predetermined or otherwise specified object 161 or a screen, associated with color face authentication, IR face authentication, or iris authentication. The specified object 161 may include an image for guiding (or representing) a relative location between the electronic device 100 and the user's eyes associated with the face authentication or the iris authentication. To cope with the issue, the user may move the electronic device 100 or may move his/her face to align the user's eyes (e.g., an image of the user's eye obtained through the iris sensor 130) output to the display 160 with a specified guide image (e.g., the object 161 as an image of an ellipse set to align the user's eye). In this operation, the display 160 may output information (e.g., at least one of an image or a text) associated with the progress of face authentication or iris authentication. For example, the display 160 may output at least one of guide information for guiding a user's eyes or face to move or incline in a specified direction, information about how much the user's eyes or face is aligned with the object 161, information for guiding the obtainment of an image according to the alignment of the user's eyes or face with the object 161, information about whether face authentication or iris authentication is performed, or information about whether the face authentication or the iris authentication is successful.

In the descriptions, for example, the face authentication may be performed based on at least one of the color camera sensor 180 and the iris sensor 130. According to an embodiment, the electronic device 100 may select an authentication method depending on the authentication level and may perform at least one of face authentication based on the color camera sensor 180, face authentication based on the iris sensor 130, or iris authentication based on the iris sensor 130, depending on the selected authentication method. According to various embodiments, the display 160 may output at least one of information about a type of the selected authentication method, authentication execution information according to the corresponding authentication method, or authentication execution result information.

The sensor 170 may be disposed on one side (e.g., the first surface, the second surface, or the side area of the housing 101) of the electronic device 100. For example, the sensor 170 may include at least one of an illuminance sensor sensing external illuminance, a proximity sensor determining whether an object is approached, a time-of-flight (TOF) sensor sensing a distance between an object and the electronic device 100, a touch sensor determining whether an object is contact, or a pressure sensor sensing how much an object is pressed, or a location sensor sensing the location of the electronic device 100. According to an embodiment, the electronic device 100 may transmit illuminance information collected by an illuminance sensor in the sensor 170, the current location information of the electronic device 100, or the like to the server device 200.

The iris sensor 130 may include a light emitting unit 131 emitting light of a specified wavelength band (e.g., an infrared wavelength band) and an infrared camera (e.g., an iris camera 132) obtaining an image (e.g., an IR image) corresponding to the light of the specified wavelength band, as a type of an image sensor.

The light emitting unit 131 may emit the light of the specified wavelength band. For example, the light emitting unit 131 may include at least one of an IR-LED or an IR-LD. According to an embodiment, the light emitting unit 131 may output the light of an infrared wavelength band at a specified time point (e.g., at a point in time when iris sensing is requested). Depending on the control, the light emitting unit 131 may emit the light of the infrared wavelength during a specified period and may be turned off automatically if the specified period ends. According to various embodiments, the light emitting unit 131 may vary the intensity of light to be emitted, depending on the control. For example, the light emitting unit 131 may output infrared light of a specified first intensity depending on a specified first condition (e.g., in the case where an external illuminance value is not less than a specified value, in the case where a face is spaced apart from the iris camera 132 by a specified distance or more, or the like). Alternatively, the light emitting unit 131 may output the infrared light, the intensity of which is a specified second intensity (e.g., the intensity relatively lower than the first intensity), depending on a specified second condition (e.g., in the case where an external illuminance value is not greater than a specified value, in the case where a face is spaced apart from the iris camera 132 by less than a specified distance, or the like). Alternatively, the light emitting unit 131 may emit the infrared of a specified intensity regardless of a condition depending on the control.

The iris camera 132 may obtain an IR image associated with a face or an iris, based on the light emitted by the light emitting unit 131 and may transmit the obtained IR image to the processor for iris sensing or the processor 120. In this operation, the iris camera 132 may obtain an IR preview image (e.g., the preview image obtained based on Infrared wavelength) associated with, for example, the iris-related eye area of a user, under control of the processor for iris sensing. Alternatively, under control of the processor for iris sensing, the iris camera 132 may determine whether the iris area is obtained above a specified size from the IR preview image and may automatically obtain an IR still image associated with an iris if the iris area is obtained above the specified size. Alternatively, the iris camera 132 may obtain IR still images at a specified period or in response to a user input, without obtaining the IR preview image.

The processor for iris sensing may control the emission time point of the light emitting unit 131 and may control to obtain the IR image (e.g., an IR preview image or at least one IR still image) of the iris camera 132. According to an embodiment, the processor for iris sensing may receive a request associated with the operation of the iris sensor 130 from the processor 120 if an application associated with IR image-based authentication is executed, and may activate the light emitting unit 131 depending on the received request of the operation of the iris sensor 130. The processor for iris sensing may obtain an IR image associated with a subject by using the iris camera 132. The processor for iris sensing may compare an IR image pre-stored in a memory or pieces of minutiae information corresponding to the IR image with the currently obtained IR image or pieces of IR minutiae information (e.g., minutiae extracted from an IR face image or minutiae extracted from an iris image) extracted from the currently obtained IR image. For example, the pieces of IR minutiae information may include an IR face template (e.g., code information corresponding to the minutiae of an IR face) extracted from at least one IR image and iris template (e.g., code information corresponding to iris minutiae). The iris template may include digital data corresponding to information extracted from the IR image. With regard to the iris authentication, in the case where a plurality of iris images are registered, a plurality of iris templates may be stored. The plurality of iris templates may be used to be compared with the obtained iris image, and whether an iris authentication is successful may be determined depending on a difference between an iris image and each of the iris templates. According to various embodiments, the electronic device 100 may store and manage pieces of IR image-based IR face minutiae information (e.g., IR face template). The IR image-based IR face minutiae information may include an iris template extracted from an IR face image.

The color camera sensor 180 may be disposed on the first surface of the housing 101, as a type of an image sensor. The color camera sensor 180 may capture an image based on light generated from an external light source (e.g., light of the sun, an indoor light source, or the like). According to an embodiment, the color camera sensor 180 may be disposed on a front surface of the housing 101 (e.g., a first surface on which the display 160 is disposed) so as to be used to obtained a selfi image. According to various embodiments, the electronic device 100 may further include a color camera sensor exposed in the back direction of the housing 101. According to an embodiment, the color camera sensor 180 may be used to perform one authentication method depending on the requested authentication level. For example, in the case where the authentication level is a relatively low level, color face authentication based on a color face image (or an RGB face image, hereinafter referred to as a "color face image") may be utilized. The color camera sensor 180 may be activated under control of the processor of the electronic device 100 and may obtain a color face image. The processor of the electronic device 100 may perform comparison (or comparison between color face template (e.g., code information corresponding to the minutiae extracted from the color face image) including minutiae extracted from the obtained at least part of a color face image and the pre-stored color face template) between at least part of a color face image that the color camera sensor 180 obtains and the pre-stored color face image to perform face authentication.

The fingerprint sensor 190 may be disposed on at least one of the back surface, the front surface, or the side surface of the housing 101 so as to collect fingerprint information of a user. According to an embodiment, the fingerprint sensor 190 may be disposed in a specific area of the display 160 or may be disposed in a home button 151, the periphery of the home button 151, a volume key button, or a specific key button disposed in a side area, corresponding to one of the input/output interface 150. Alternatively, the fingerprint sensor 190 may be disposed in an area in which a rear camera is disposed, or a peripheral area of the rear camera. The fingerprint sensor 190 may collect fingerprint information under control of the processor 120 (or under control of a fingerprint sensor IC provided to drive the fingerprint sensor 190). The collected fingerprint information may be provided to the processor 120 and may be used for user authentication. According to various embodiments, the fingerprint sensor 190 may be selectively operated depending on the authentication level. Alternatively, the fingerprint sensor 190 may be operated depending on the authentication level together with another authentication method (e.g., an IR face authentication method based on the iris sensor 130, an iris authentication method based on the iris sensor 130, a color face authentication method based on the color camera sensor 180, or the like). If being not limited to an iris sensor or a fingerprint sensor, the biometric sensor illustrated in FIG. 3 may further include, for example, a photoplethysmographic (PPG) sensor, a skin tone measuring sensor, an electrocardiogram (ECG) electrode sensor, and the like. According to various embodiments, in the case where the color camera sensor 180 is used to measure a heart rate or a pulse, the color camera sensor 180 may be included in a biometric sensor area.

The communication circuit 110 may support the communication function of the electronic device 100. For example, the communication circuit 110 may establish a communication channel with the server device 200 through the network 11 described in FIG. 1. In this operation, the communication circuit 110 may transmit a type of the electronic device 100, user information, or the like, to the server device 200. The communication circuit 110 may receive a virtual page from the server device 200 and may output the virtual page. In this operation, the communication circuit 110 may receive authentication level information from the server device 200. The communication circuit 110 may transmit, to the server device 200, authentication information obtained in at least one authentication method corresponding to an authentication level value included in the authentication level information. In this operation, the communication circuit 110 may transmit, to the server device 200, a type of an authentication method and context information (e.g., information of a current location, a time, a type of an application, a service (or a function) type provided by an application, a battery state of the electronic device 100, or the like) at a point in time when the authentication method is performed.

The memory 140 may store at least one application program associated with the operation of the electronic device 100. According to an embodiment, the memory 140 may include an application associated with the operation of the iris sensor 130, an application associated with the operation of the color camera sensor 180, an application associated with the operation of the fingerprint sensor 190, or the like. The memory 140 may include authentication reference information 141 and recognizer operating information 142.

For example, the authentication reference information 141 may include an iris image or an iris template associated with iris authentication, at least part of an IR face image or an IR face template associated with IR face authentication, at least part of a color face image or a color face template associated with color face authentication, a fingerprint image or a fingerprint minutiae information associated with fingerprint authentication, and audio fingerprint minutiae information of a specified utterance actor or code information corresponding to the audio fingerprint minutiae information, which is associated with audio fingerprint authentication.

Figure 4:
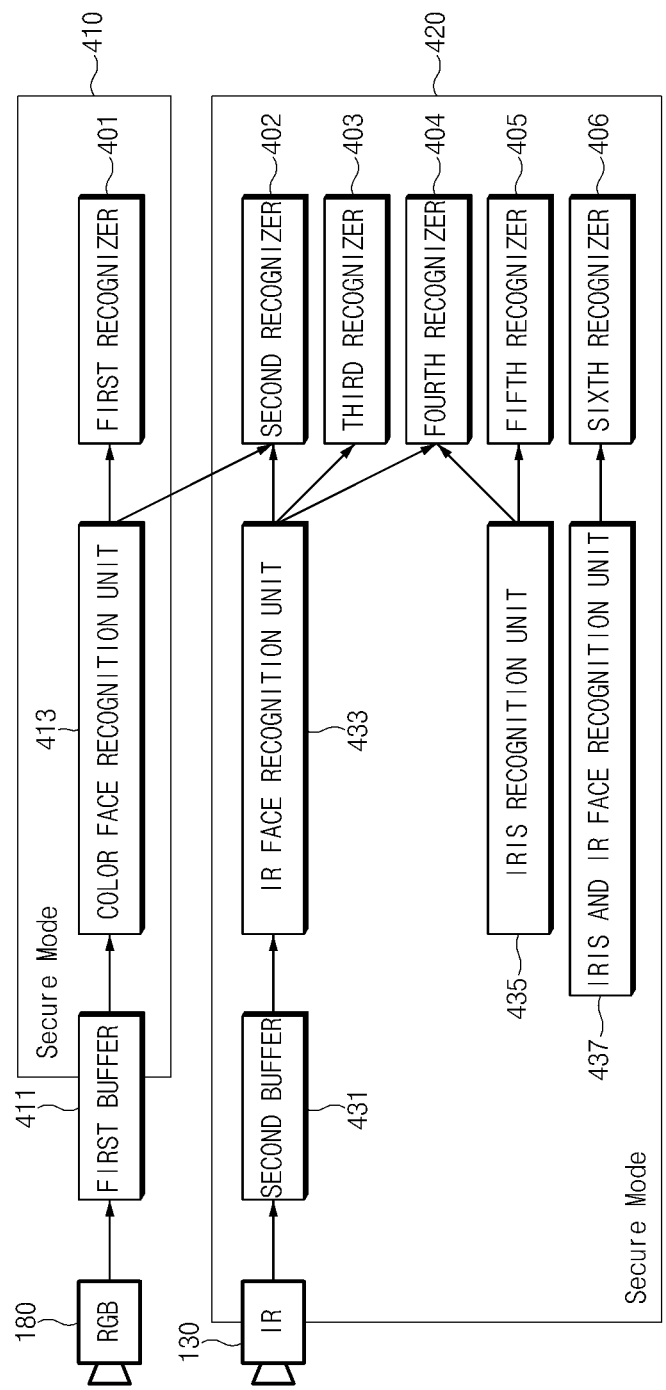
FIG. 4 is a block diagram for describing an example of a configuration of an image sensor-based device performing authentication for each authentication level, according to an embodiment of the present disclosure.

The recognizer operating information 142 may include setting information for defining the authentication method to be performed for each authentication level. For example, the recognizer operating information 142 may include information in which a plurality of recognitions to be described below in FIG. 4 are respectively mapped with authentication levels. For example, the recognizer operating information 142 may store information set to operate a first recognizer or a second recognizer in the case where the first authentication level is requested, information set to operate one of the second recognizer or a third recognizer in the case where the second authentication level is requested, information set to operate a fourth recognizer, a fifth recognizer, or a sixth recognizer in the case where the third authentication level is requested, or the like. According to various embodiments, the recognizer operating information 142 may store setting information for performing color face authentication depending on a first authentication level, setting information for performing IR face authentication depending on the second authentication level, setting information for performing color face authentication and IR face authentication depending on a third authentication level, setting information for performing fingerprint authentication or iris authentication depending on a fourth authentication level, setting information for performing color face authentication and iris authentication depending on a fifth authentication level, setting information for performing IR face authentication and iris authentication depending on a sixth authentication level, or the like. According to various embodiments, the recognizer operating information 142 may include setting information for performing color face authentication and fingerprint authentication depending on a specified authentication level, setting information for performing IR face authentication, iris authentication, or fingerprint authentication depending on a specified authentication level, or the like. As described above, the recognizer operating information 142 may include information about a type of authentication method to be performed depending on the authentication level. The type information of the authentication method to be performed depending on the authentication level may be recorded in the server device 200 and may be synchronized with the electronic device 100. According to various embodiments, the recognizer operating information 142 may include pieces of information about a recognizer to be performed for context information of the electronic device 100.

According to an embodiment, the memory 140 may include an authentication application performing adaptive authentication according to the authentication level. If receiving authentication level information from an application or the server device 200, the authentication application may include an instruction set for obtaining the recognizer operating information 142 suitable for the received authentication level, an instruction set for collecting the context information of the electronic device 100, an instruction set for selecting an authentication method, which is suitable for the current context information of the electronic device 100, from at least one authentication method defined in the obtained recognizer operating information 142, an instruction set for performing authentication depending on the selected authentication method, or an instruction set for processing a function according to the authentication result. Additionally or alternatively, the authentication application may include an instruction set for transmitting, to the server device 200, the authentication execution result and context information of the electronic device 100 upon performing authentication.

The processor 120 may be mounted in a printed circuit board seated inside the housing 101. The processor 120 may perform authentication by using at least one of sensors for performing authentication included in a biometric sensor or the color camera sensor 180 and may transmit the authentication result according to the performance to the server device 200. In this operation, the processor 120 may select a recognizer based on at least one of an authentication level that the application being currently executed requests or an authentication level that the server device 200 requests. The processor 120 may verify authentication methods that are capable of being performed by the selected recognizer and may perform authentication according to at least one authentication method of a plurality of authentication methods depending on the current context information of the electronic device 100. As such, even in the case of the same application and the same server device 200 in the electronic device 100 according to an embodiment of the present disclosure, the authentication method may be changed depending on the current context information of the electronic device 100.

FIG. 4 is a block diagram illustrating an example configuration of an image sensor-based device performing authentication for different authentication levels, according to an embodiment of the present disclosure.

Referring to FIG. 4, the electronic device 100 according to an embodiment of the present disclosure may perform authentication according to a first security flow 410 and a second security flow 420. For example, the first security flow 410 may include the color camera sensor 180, a first buffer 411, a color face recognition unit 413, and a first recognizer 401. The color camera sensor 180 may include a hardware configuration. The first buffer 411 may include at least part of a memory (e.g., such as a secure memory). The color face recognition unit 413 may be implemented with at least one of software or hardware. The first recognizer 401 may include at least one processor or may be at least part of the above-described processor.

As described above, the color camera sensor 180 (e.g., an RGB image sensor, an RGBG image sensor, or the like) may include a camera sensor capable of obtaining a color image or a color face image. For example, the color camera sensor 180 may be disposed on a same surface (e.g., the first surface on which the display 160 is disposed) on which the iris sensor 130 is also disposed. The color camera sensor 180 may be connected to the first buffer 411 depending on an operating method. The color camera sensor 180 according to various embodiments may obtain an image of a user, such as a "selfie" picture. In this case, the selfie image that the color camera sensor 180 obtains may be stored and managed in a memory.

The first buffer 411 may be allocated in the case where the color camera sensor 180 is used to perform user authentication. The first buffer 411 may operate in a secure environment. For example, the first buffer 411 may be arranged in a "trust zone." Alternatively, the first buffer 411 may include at least part of an area of the memory configured to be accessible in a secure manner. In the case where the color camera sensor 180 is used to perform user authentication, the first buffer 411 may be initialized; and in the case where the user authentication is completed, the first buffer 411 may be initialized. According to various embodiments, in the case where the color camera sensor 180 is used for a normal image capture (e.g., selfie image capture), a buffer (or a memory) capable of being accessed in a normal environment may be allocated or the first buffer 411 may be configured to be accessed in a normal environment.

The color face recognition unit 413 may compare an image stored in the first buffer 411 with specified authentication reference information 141, and may provide the comparison result. According to an embodiment, the color face recognition unit 413 may perform the comparison between a currently obtained color face image and the pre-stored color face image, and output the difference value of the comparison. In the case where the difference value is not greater than a specified threshold value, the color face recognition unit 413 may determine that the currently obtained color face image is similar to the pre-stored color face image, and thus determine that the authentication is successful. The color face recognition unit 413 may be operated in a secure environment. In this regard, if user authentication is requested in the normal environment, a normal processor supporting the normal environment may request a secure processor supporting the secure environment to operate the color face recognition unit 413. The secure processor may activate the color face recognition unit 413 depending on the request of the normal processor and may allow authentication based on the image stored in the first buffer 411 to be performed.

The first recognizer 401 may include at least one processor that is configured to perform color face authentication based on the color face recognition unit 413. Alternatively, the secure processor may operate the color face recognition unit 413 based on the first recognizer 401 to perform authentication on a color face image. In this regard, the first recognizer 401 may be implemented with, for example, at least part of the above-described secure processor.

The second security flow 420 may include the iris sensor 130, a second buffer 431, an IR face recognition unit 433, an iris recognition unit 435, an iris and IR face recognition unit 437, a second recognizer 402, a third recognizer 403, a fourth recognizer 404, a fifth recognizer 405, and a sixth recognizer 406.

The iris sensor 130 may include a hardware configuration. The second buffer 431 may include at least part of a memory (e.g., secure memory). At least one of the IR face recognition unit 433, the iris recognition unit 435, and the iris and IR face recognition unit 437 may be implemented with at least one of software or hardware. At least one of the second to sixth recognizers 402, 403, 404, 405, and 406 may include at least one processor or may be at least part of the above-described processor.

As described above, the iris sensor 130 may include a light emitting unit and an iris camera sensor. The iris sensor 130 may obtain an IR image if a specified condition is satisfied, and may transmit the obtained IR image to the second buffer 431.

The second buffer 431 may store an IR image that the iris sensor 130 collects. The second buffer 431 may be configured to be accessible in the secure environment. If the obtainment of the IR image is requested, the second buffer 431 may be initialized. If user authentication based on an IR image is completed, the second buffer 431 may be initialized. The IR image stored in the second buffer 431 may be used by at least one of the IR face recognition unit 433, the iris recognition unit 435, and the iris and IR face recognition unit 437.

The IR face recognition unit 433 may compare the IR image stored in the second buffer 431 with the IR image pre-stored in the memory 140; and the IR face recognition unit 433 may compare (or compare templates) minutiae associated with face recognition. For example, the IR face recognition unit 433 may extract an IR face image from the IR image and may compare the extracted IR face image with the IR face image stored in the memory 140 to output a difference value. In the case where the output difference value is not greater than a specified threshold value, the IR face recognition unit 433 may determine that the authentication is successful. The IR face recognition unit 433 may be operated by the second recognizer 402, the third recognizer 403, the fourth recognizer 404, or the like.

The iris recognition unit 435 may compare the IR iris image of the IR image stored in the second buffer 431 with the IR iris image pre-stored in the memory 140. The iris recognition unit 435 may determine whether iris authentication is successful, based on the difference value according to the comparison result. For example, in the case where a difference value between the currently obtained iris image and the pre-stored iris image is not greater than a specified threshold value, the iris recognition unit 435 may determine that the authentication is successful.

The iris and IR face recognition unit 437 may compare the iris image and the IR face image at the same time. For example, the iris and IR face recognition unit 437 may detect an iris image and an IR face image from the currently obtained IR image. The iris and IR face recognition unit 437 may determine whether a first difference value obtained by comparing the iris image with the pre-stored iris image and a second difference value obtained by comparing the IR face image with the pre-stored IR face image are within a specified range; in the case where the first difference value and the second difference value are within the specified range, the iris and IR face recognition unit 437 may determine that the authentication is successful. In the above-described details, it is described that the currently obtained image is compared with the image pre-stored in a memory. However, as described above, in the authentication execution, the electronic device 100 may compare minutiae of images, may compare templates (e.g., code information corresponding to minutiae extracted from an image) generated from images, or may generate specified models to compare the models.

For example, the second recognizer 402 may include a processor configured to operate the color face recognition unit 413 and the IR face recognition unit 433. Alternatively, the secure processor may operate the color face recognition unit 413 and the IR face recognition unit 433, based on the second recognizer 402. If the second recognizer 402 is selected depending on an authentication level, the electronic device 100 may determine whether the authentication is successful, based on the authentication execution result that is based on the color face recognition unit 413 and the IR face recognition unit 433. According to various embodiments, the electronic device 100 may detect a difference value between the posture of a color image obtained based on the color camera sensor 180 and the posture of an IR image obtained based on the iris sensor 130; in the case where the posture difference value is not less than a reference value, the electronic device 100 may determine that the authentication fails.

For example, the third recognizer 403 may include a processor configured to operate the IR face recognition unit 433. Alternatively, the secure processor may operate the IR face recognition unit 433, based on the third recognizer 403. In this regard, the third recognizer 403 may be at least part of the secure processor.

For example, the fourth recognizer 404 may include a processor configured to operate the IR face recognition unit 433 and the iris recognition unit 435. The fifth recognizer 405 may include a processor configured to operate the iris recognition unit 435. The sixth recognizer 406 may include a processor configured to operate the iris and IR face recognition unit 437.

The operation associated with the above-described recognizer may be performed according to Table 1 below.

TABLE 1

| Recognizer type | First engine | Second engine | Authentication level | Context information |
|---|---|---|---|---|
| First recognizer | color face image | | 1 | Daylight (daytime light), outdoor, wide angle |
| Second recognizer | IR face image | Color face image | 2 | Dark place |
| Third recognizer | IR face image | | 2 | Dark place |
| Fourth recognizer | IR iris image | IR face image | 3 | Dark place, high security level |
| Fifth recognizer | IR iris image | | 3 | Dark place, high security level |
| Sixth recognizer | IR iris and face image | | 3 | Maximum security level |

In Table 1, a first engine may be used for a main recognizer for authentication, and a second engine may be operated in an auxiliary method (an auxiliary recognizer) when performing authentication for checking liveness, or the like. As such, the fourth recognizer 404 may perform (e.g., compare templates) user authentication based on IR iris authentication; the obtained IR face image may be used in a manner that checks liveness to increase the reliability of authentication. The sixth recognizer 406 may be used in the manner that perform authentication (e.g., the comparison of an IR iris template and the comparison of an IR face template) on an IR face image obtained together with an IR iris to increase an authentication rate itself.

Compared with other recognizers, the first recognizer 401 illustrated in Table 1 may be relatively simple and may have a fast execution speed. The second recognizer 402 may include the characteristic of the first recognizer 401 and may additionally have the characteristic for checking liveness (as an element capable of determining whether an image being captured is a real person, a shake (e.g., the fine shaking of a pupil and the fine shaking of posture) occurs when a person is captured differently from capturing an image such as a photo. The liveness includes the above-described element of the fine movement of an animal), and thus the second recognizer 402 may have the relatively high security performance. According to various embodiments, the iris sensor 130 may obtain light of good quality in a low-illuminance compared with the color camera sensor 180; even if there is contamination of a face image (e.g., makeup or sweat), the iris sensor 130 may obtain an image of relatively good quality. As such, the second recognizer 402 using the iris sensor 130 may provide a good authentication success rate by obtaining a good image in a relatively dark area (or at night or in a low light environment) compared with the first recognizer 401. In addition, compared with the first recognizer 401, the second recognizer 402 may have the robust characteristic for false recognition.

The third recognizer 403 may have a characteristic capable of operating in a dark environment. The fourth recognizer 404 may have a characteristic capable of having a relatively low authentication error rate and checking liveness; and the fifth recognizer 405 may have a characteristic capable of having a relatively low authentication error rate. The sixth recognizer 406 may have a characteristic capable of having a relatively low authentication error rate, and thus may provide a high security performance.

In above-described first security flow 410, the first buffer 411, the color face recognition unit 413, and the first recognizer 401 may be operated in a secure mode. In addition, in the second security flow 420, the second buffer 431, the IR face recognition unit 433, the iris recognition unit 435, and the iris and IR face recognition unit 437, and the second to sixth recognizers 402, 403, 404, 405, and 406 may be operated in a secure mode. In this regard, the electronic device 100 may include a normal processing mode and a secure processing mode that are divided logically or physically. Compared with the secure processing mode, the normal processing mode may process the operation of data or an application of relatively low security level. Compared with the normal processing mode, the secure processing mode may process the operation of data or an application of relatively high security level. According to various embodiments, the secure processing mode may be set based on a trust zone.

According to various embodiments, an electronic device may include a biometric sensor (e.g., a color camera sensor, an iris sensor, a fingerprint sensor, a heart rate sensor, a microphone for audio fingerprint recognition, or the like), a memory storing at least one application and an authentication method setting table for setting at least one authentication method performed for each authentication level, a communication circuit communicating with a server device, or a processor. The processor may be configured to receive authentication level information from the application or the server device, to select one authentication method of a plurality of authentication methods capable of being performed in association with the authentication level or an authentication level higher than the authentication level, and to perform user authentication based on the selected authentication method.

According to various embodiments, an electronic device may include one or more biometric sensors, a memory storing an authentication method setting table associated with one or more authentication methods capable of being performed based on an authentication level, a communication circuit communicating with an external device, and a processor. The processor may be configured to receive authentication level information associated with a function executed by the electronic device, to select at least one authentication method of the one or more authentication methods based on the received authentication level information, and to perform user authentication based on the selected at least one authentication method.

According to various embodiments, the processor may be configured to obtain context information including at least one of sensor information (e.g., information about the location of the electronic device, information about an illumination environment, temperature information, altitude information, humidity information, or the movement-based user state information such as a running state, a walking state, a riding state, or the like) obtained based on a sensor installed in the electronic device, device information (e.g., the current usage time or battery level of an electronic device) obtained depending on a hardware operation of the electronic device, or function execution information (e.g., an authentication history or a type of an execution-requested function) obtained depending on the operation of the electronic device and to select specified at least one authentication method based on the context information.

According to various embodiments, the processor may be configured, if a location of the electronic device is within a specified first location range, to select a first authentication method of a first level range among the one or more authentication methods and, if the location of the electronic device is within a specified second location range, to select a second authentication method of a second level range among the one or more authentication methods, based at least on the context information.

According to an embodiment, the processor may be configured to select a first authentication method (e.g., an authentication method based on the first recognizer 401), the authentication level of which is relatively low, from among the plurality of authentication methods, in the case where the location of the electronic device is within a first location range (e.g., an area where the electronic device is firstly registered or where the electronic device is used predominantly) and to select a second authentication method (e.g., an authentication method using at least one recognizer of the second to sixth recognizers 402, 403, 404, 405, and 406), the authentication level of which is relatively high, from among the plurality of authentication methods, in the case where the location of the electronic device is within a second location (e.g., an area outside the country or the region where the use of the electronic device is registered or a roaming area).

According to various embodiments, the processor may be configured, if a current usage time of the electronic device is within a first time range, to select a first authentication method of a specified first level range among the one or more authentication methods, and, if the current usage time of the electronic device is within a second time range, to select a second authentication method of a specified second level range among the one or more authentication methods, based at least on the context information.

According to an embodiment, the processor may be configured, if the current usage time of the electronic device is within a first time (e.g., daytime), to select the first authentication method, the authentication level of which is relatively low, from among the plurality of authentication methods, and, if the current usage time of the electronic device is within a second time (e.g., nighttime), to select the second authentication method, the authentication level of which is relatively high, from among the plurality of authentication methods.

According to various embodiments, the processor may be configured, if an external illuminance of the electronic device is within a first illuminance range, to select a first authentication method based on an image sensor operable in the first illuminance range, and, if the external illuminance of the electronic device is within a second illuminance range, to select a second authentication method based on an image sensor operable in the second illuminance range, based at least on the context information.

According to an embodiment, the processor may be configured, in the case where the external illuminance of the electronic device is not less than a first illuminance value (e.g., daytime or outdoor environment), to select a first authentication method based on an image sensor operable in a relatively high illuminance value, and, in the case where the external illuminance of the electronic device is less than the first illuminance value (e.g., nighttime or indoor environment), to select a second authentication method based on an image sensor operable in a relatively low illuminance value.

According to various embodiments, the processor may be configured, if a battery level of the electronic device is not less than a first threshold value, to select a first authentication method of a first power consumption range, and, if the battery level of the electronic device is less than the first threshold value, to select a second authentication method of a second power consumption range, based at least on the context information.

According to an embodiment, the processor may be configured, in the case where the battery level of the electronic device is not less than a first threshold value, to select a first authentication method, the power consumption of which is relatively high, and, in the case where the battery level of the electronic device is less than the first threshold value, to select a second authentication method (or a fifth authentication method), the power consumption of which is relatively low.

According to various embodiments, the processor may be configured to verify an authentication history of the electronic device and to select an authentication method corresponding to a relatively high authentication level based on a length of time elapsed after a point in time when authentication is successful, based at least on the context information.

According to an embodiment, the processor the processor may be configured to verify an authentication history of the electronic device and to select an authentication method corresponding to a relatively high authentication level based on a length of time elapsed after a point in time when authentication is successful (e.g., after authentication for unlocking a lock screen is successful or after authentication associated with the execution of a specified function is successful).

According to various embodiments, the processor may be configured to verify an authentication history of the electronic device, to verify the location change of the electronic device after a point in time when authentication is successful, and, after changing an authentication level based on the variation of a place, to select an authentication method corresponding to the changed authentication level. For example, after a point in time when authentication is successful, in the case where the current place is a pre-registered home, the processor may be configured to perform an authentication method corresponding to a relatively low authentication level. Alternatively, after a point in time when authentication is successful, in the case where the current place is a public place, such as the pre-registered open area or an office, or an area in which floating population is not less than the specified number, the processor may be configured to perform an authentication method corresponding to a relatively high authentication level. In the above-described operation, after performing authentication success, the processor may be configured to change the authentication level (or the authentication method) by complexly applying the elapsed time and the location change according to the movement. For example, even though the current location is a public location, in the case where the current time is within a specified first time (e.g., within 5 minutes) after authentication is successful, the processor may be configured to apply a relatively low authentication level (or authentication method). Alternatively, in the case where the current location is a specified location (e.g., a user's room), if the initial authentication succeeds after entering the corresponding area, the processor may be configured to continuously apply a low authentication level (or authentication method) in the case where the user does not leave the corresponding location.

According to various embodiments, in the case where the amount of change in the location is not less than a specified value, the processor of the electronic device may perform a relatively high authentication method. For example, the processor may collect first location information upon performing first authentication, and second location information upon requesting second authentication and may calculate a distance difference between the first location information and the second location information. The processor may be configured, in the case where the distance difference value is within a specified first range, to perform an authentication method corresponding to a first authentication level and, in the case where the distance difference value is out of the specified first range, to perform an authentication method corresponding to a second authentication level, the security of which is higher than the security of the first authentication level. For example, in the case where the first authentication is performed in Korea, in the case where the second authentication is performed in Japan or the United States, and in the case where the current time is within the specified first time range (e.g., within 30 minutes) after the first authentication is performed, the processor may perform an authentication method of a relatively high authentication level. For example, in a context set to perform color face recognition, in the case where a variation in the place within the specified time range is out of a first range, the processor may perform authentication based on an iris sensor using a fourth recognizer or a sixth recognizer or may perform authentication based on a fingerprint sensor.

According to various embodiments, with regard to the above-described operation, a server device may collect the context information about the variation in the place of the electronic device, and may make a request for a relatively high authentication level to the electronic device in the case where the variation in the place is not less than a specified value (e.g., in the case where the variation in the place is out of a specified distance). In this regard, the electronic device may perform authentication based on an authentication method corresponding to the received authentication level and may transmit the authentication result to the server device.

According to various embodiments, the processor may be configured to output a list for selecting at least one authentication method, which is based at least on the one or more biometric sensors, from among the one or more authentication methods and to perform an authentication method selected from the list in response to a user input, based at least on the context information.

According to an embodiment, the processor may be configured to output a list for selecting at least one authentication method, which is suitable for the authentication level, from among a plurality of authentication methods based on a plurality of sensors included in the biometric sensor and to perform an authentication method selected by a user input.

According to various embodiments, the processor may be configured to output guide information indicating the authentication execution result and the context information.

According to various embodiments, the processor may be configured to transmit (e.g., provide information for Fraud detection), to the server device, context information in a state where the specified authentication method is performed, based on the authentication execution result of the specified authentication method.

According to various embodiments, an electronic device according to an embodiment may include a biometric sensor, a color camera sensor, and a processor. The processor may be configured to verify an authentication level associated with a function performed by the electronic device, in the case where the authentication level satisfies a first specified condition, to obtain first biometric information about a user from the external object by using the color camera sensor, in the case where the authentication level satisfies a second specified condition, to obtain second biometric information about the user by using the biometric sensor, and to perform authentication on the user by using the corresponding biometric information of the first biometric information and the second biometric information.

According to various embodiments, the processor may be configured to obtain first biometric information by using the color camera sensor and to perform user authentication based on the first biometric information and the second biometric information.

According to various embodiments, an electronic device according to an embodiment may include a biometric sensor and a processor. The processor may be configured to verify an authentication level associated with a function performed by the electronic device, in the case where the authentication level satisfies a first specified condition, to obtain first biometric information about a user from the external object by using the biometric sensor, in the case where the authentication level satisfies a second specified condition, to obtain second biometric information about the user by using the biometric sensor, and to perform authentication on the user by using the corresponding biometric information of the first biometric information and the second biometric information.

According to various embodiments, the electronic device may further include a color camera sensor. The processor may be configured to obtain an image using the color camera sensor in the case where the authentication level satisfies a second specified condition, and to perform user authentication based on an image that the color camera sensor obtains and the second biometric information.

Figure 5:
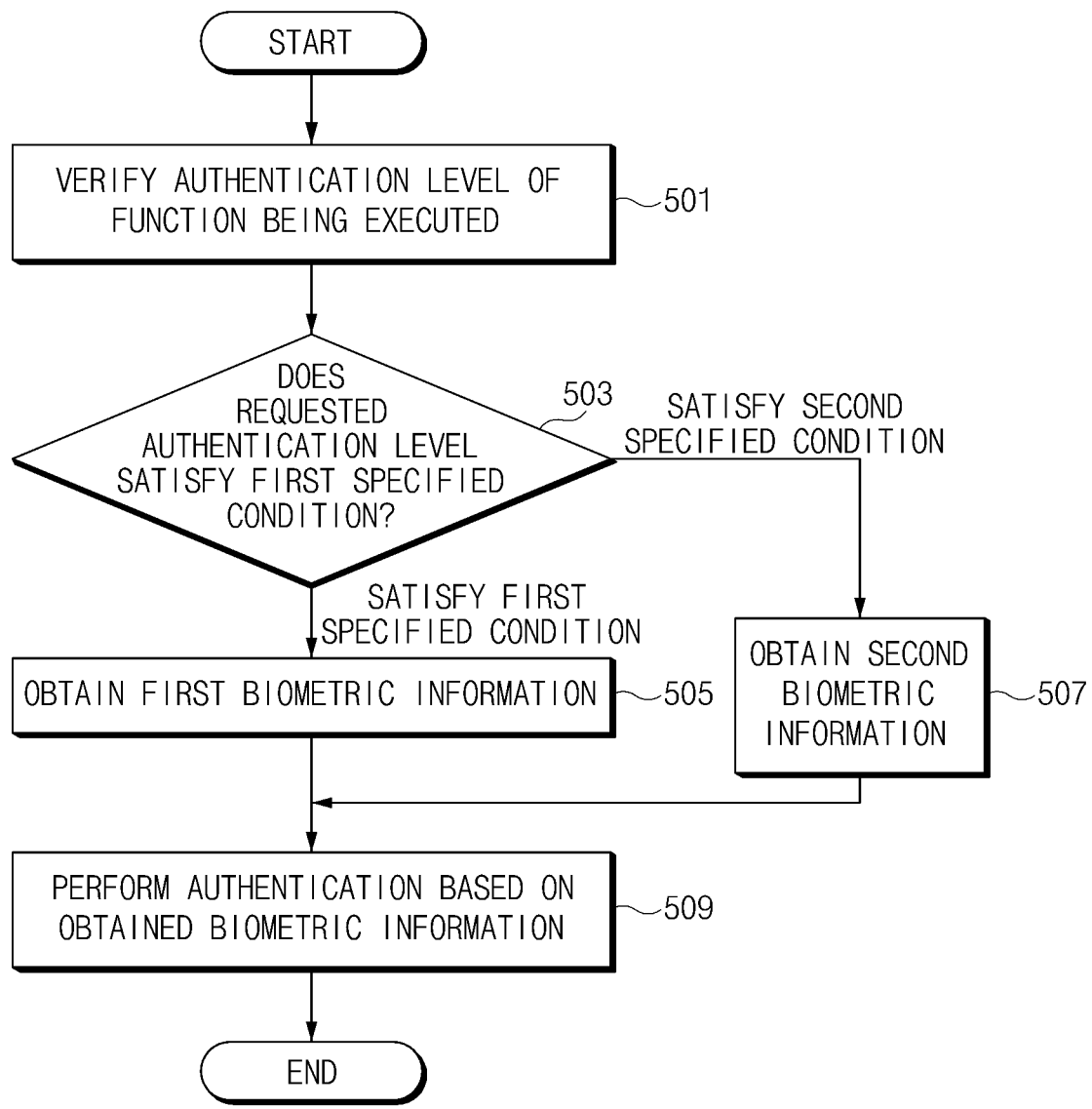
FIG. 5 is a flowchart for describing an example of an adaptive authentication performing method according to an authentication level and a user environment, according to an embodiment of the present disclosure.

FIG. 5 is a flowchart illustrating an example adaptive authentication method, which operates according to an authentication level and a user environment, in an embodiment of the present disclosure.

Referring to FIG. 5, in operation 501, the processor 120 may verify the authentication level of a function being executed. For example, the processor 120 may verify an authentication level requested by an application that is currently being executed, and may verify the authentication level as requested by a server device associated with the application being executed.

In operation 503, the processor 120 may determine whether the requested authentication level satisfies a first specified condition. For example, the processor 120 may determine whether the requested authentication level satisfies a condition, such that a first authentication level is to be requested.

If the first specified condition (e.g., a condition to perform authentication at the first authentication level) is satisfied, in operation 505, the processor 120 may obtain first biometric information. In this regard, the processor 120 may select an authentication method from one or more possible authentication methods, as based on the first authentication level. Selection of an authentication method may include the processor 120 collecting context information such as one or more of sensor information using at least one sensor, a battery level, or the like and may select the authentication method according to the corresponding context information. Alternatively, the processor 120 may select one authentication method from one or more available authentication methods corresponding to the requested authentication level, or even an authentication level higher than the requested authentication level, depending on a specified configuration, user policy or a received user input. The processor 120 may collect the first biometric information (e.g., a color face image or the like) using the biometric sensor set depending on the selected authentication method and/or the color camera sensor 180.

In contrast, referring again to step 503, if a second specified condition (e.g., a condition to perform authentication at the second authentication level) is satisfied, in operation 507, the processor 120 may obtain second biometric information instead of the first biometric information of operation 505. The processor 120 may select one method of at least one authentication method performed in association with a second authentication level or an authentication level higher than the second authentication level and may collect the second biometric information (e.g., a IR face image or the like) by using the biometric sensor set depending on the selected authentication method or the color camera sensor 180.

In operation 509, the processor 120 may perform authentication based on the obtained biometric information (e.g., either the first or second biometric information that was received). The processor 120 may compare the obtained biometric information (e.g., a color face image, an IR face image, an IR iris image, or the like) with authenticating biometric information pre-stored in the memory 140, and may determine whether authentication is successful based on a result of the comparison. Additionally or alternatively, the processor 120 may transmit the authentication execution result to the server device 200. In this operation, the processor 120 may obtain context information of the electronic device 100 in a process to perform authentication and may transmit the authentication execution result and the obtained context information to the server device 200 together.

Figure 6A:
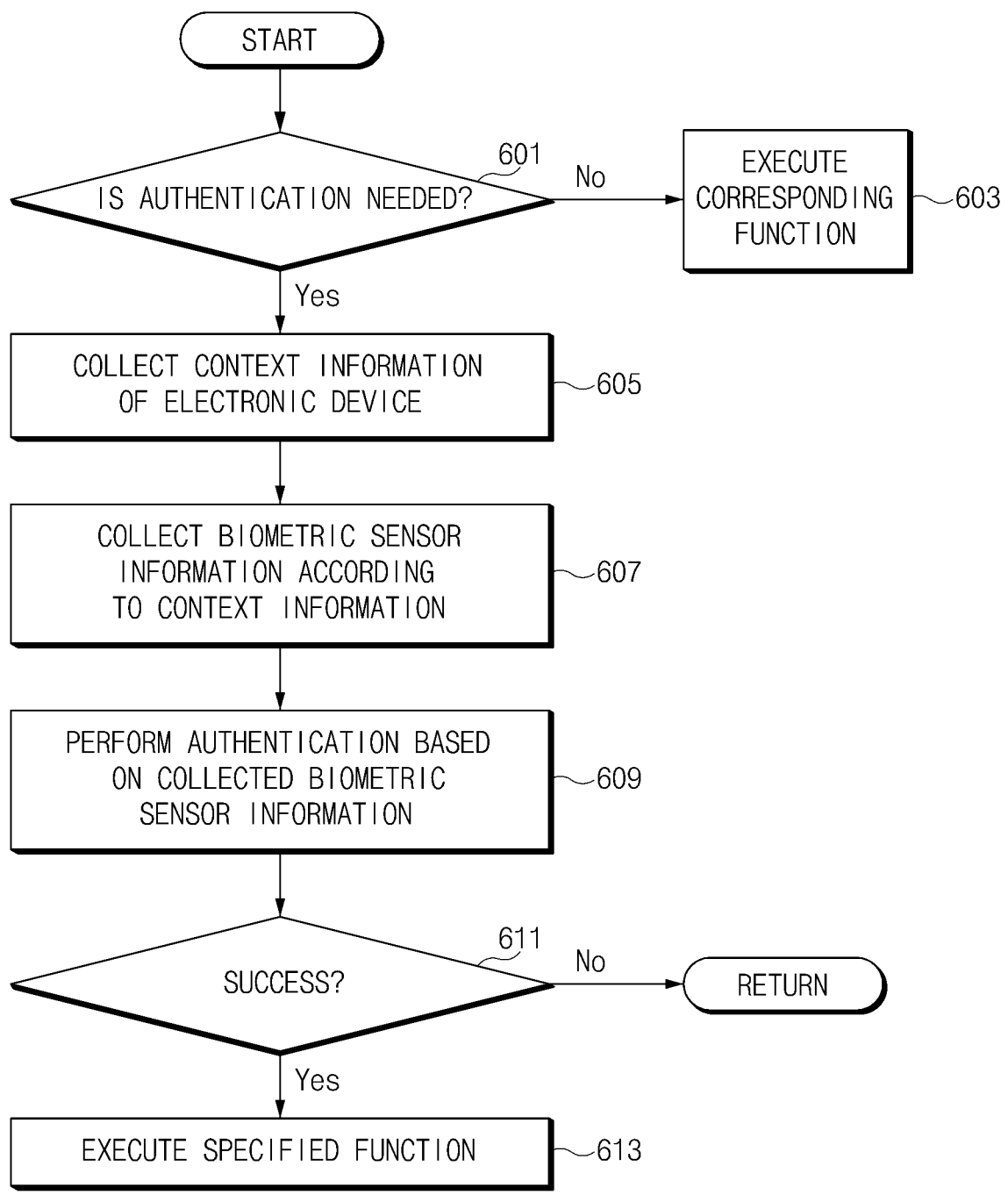
FIG. 6A is a flowchart illustrating an example of an adaptive authentication performing method according to context information, according to an embodiment of the present disclosure.

FIG. 6A is a flowchart illustrating an example adaptive authentication method using context information, according to an embodiment of the present disclosure.

Referring to FIG. 6A, in operation 601, the processor 120 may determine whether authentication is needed or otherwise requested. For example, the processor 120 may determine whether the authentication is requested by an application presently being executed. Alternatively, the processor 120 may determine whether the authentication associated with a function that a user requests to execute is requested. Alternatively, the processor 120 may determine whether the authentication is requested or may determine whether the authentication is requested by the server device 200, in association with the execution of a specified function of the electronic device 100. In the case where the authentication is not utilized, in operation 603, the processor 120 may execute the corresponding function needs to be executed depending on a user input or the scheduling of the electronic device 100. For example, the processor 120 may output an execution screen according to the execution of an application, in the display 160 or may output a virtual page received from the server device 200 in the display 160. Alternatively, the processor 120 may remain in a sleep state.

In operation 605, the processor 120 may collect context information of the electronic device 100. For example, the processor 120 may collect environmental or ambient information (e.g., such at least one of illuminance information, humidity information, altitude information, location information, or temperature information) of the electronic device 100 and classify it as context information, the information collected using at least part of the sensor 170. Alternatively, the processor 120 may further retrieve a current time or a present season, a battery level, and/or historical information indicating whether authentication is repeatedly performed during a particular time, or the like as the context information.

In operation 607, the processor 120 may collect biometric information according to the context information. For example, the processor 120 may operate the first recognizer 401 or the second recognizer 402 depending on a current illuminance value. According to an embodiment, in the case where the current illuminance value is not less than (e.g., equal or greater than) a specified threshold value, the processor 120 may obtain a color face image based on the first recognizer 401. In the case where the current illuminance value is less than the specified threshold value, the processor 120 may obtain an IR face image based on the second recognizer 402. As described above, the processor 120 may select at least one recognizer depending on the context information and may collect biometric information based on the biometric sensor set in the selected recognizer or the color camera sensor 180.

In operation 609, the processor 120 may perform authentication based on the collected biometric information. For example, the processor 120 may verify the collected biometric information and the authentication reference information 141 corresponding to the corresponding biometric information, in the memory 140 and may determine whether authentication is successful, based on the comparison value between the obtained biometric information and the authentication reference information 141.

In operation 611, the processor 120 may determine whether the authentication is successful. In the case where the authentication fails, the processor 120 may return to a specified state. For example, in the case where the authentication is continuously requested, the processor 120 may branch to operation 605 and may perform the following operation again. In the case where the authentication is successful, in operation 613, the processor 120 may execute a specified function depending on the authentication success. For example, the processor 120 may execute the authentication requested application or the function of an application, depending on the authentication success.

As described above, according to an embodiment of the present disclosure, the adaptive authentication performing method may determine whether the authentication is utilized, and may select and perform an authentication method according to an electronic device context if the authentication is utilized.

Figure 6B:
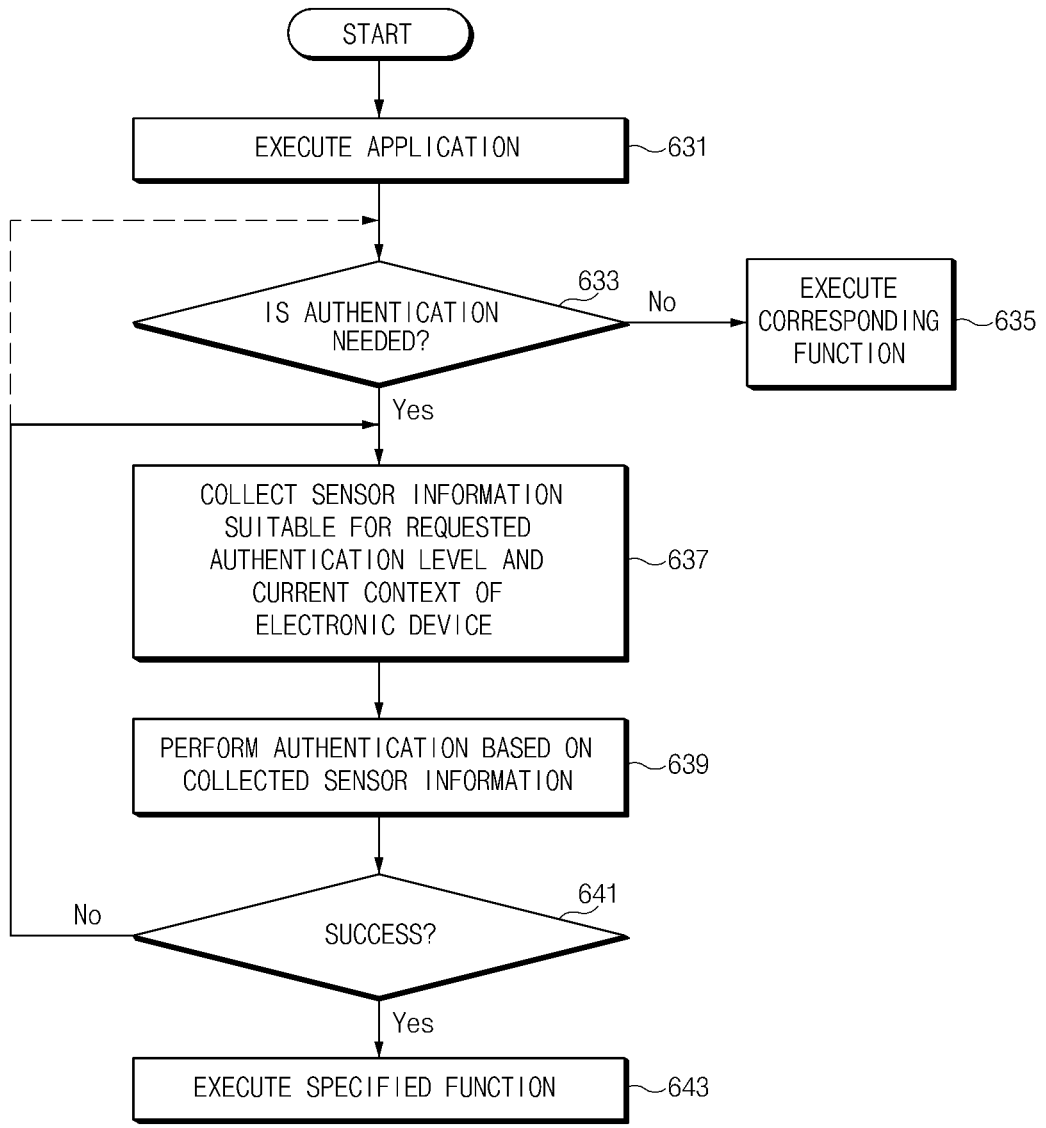
FIG. 6B is a flowchart illustrating an example of an adaptive authentication performing method suitable for an authentication level and a current context, according to an embodiment of the present disclosure.

FIG. 6B is a flowchart illustrating an example adaptive authentication method for an authentication level and a current context, according to an embodiment of the present disclosure.

Referring to FIG. 6B, in operation 631, the processor 120 may execute an application in response to receiving (e.g., detecting) a user input, or based on a preset scheduled event (e.g., preset scheduling information). Upon executing the application, the processor 120 may output a screen corresponding to the execution of the application, on the display 160.

In operation 633, the processor 120 may determine whether authentication is requested for the executed application. For example, the processor 120 may determine whether an application function utilizing user authentication has been executed. In this regard, if the specified function or service is requested, the application may request the authentication in association with the execution of the corresponding function or service. Alternatively, with regard to the execution of the specified function or service of the application, the server device 200 may request that the electronic device 100 perform authentication. In this operation, the application or the server device 200 may provide the electronic device 100 with authentication level information associated with an execution of the corresponding function or service. In the case where the authentication is not requested with regard to the execution of the specified function or service, in operation 635, the processor 120 may execute the corresponding function or service. As such, the processor 120 may output a screen according to function execution or service execution, in the display 160.

If the authentication is requested, in operation 637, the processor 120 may collect biometric information suitable for (e.g., associated with or corresponding to) the requested authentication level and the current context of the electronic device 100. The function or service utilizing authentication may include, for example, a payment service, a transfer service, a loan service, an account balance inquiry function, a use history inquiry function, and the like, which are based on a financial application. Alternatively, the function or service may include a character selection function, an item purchase function, and an item exchange function based on a game application. If receiving the authentication level information from an application or the server device 200, the processor 120 may verify an authentication level value included in the corresponding information. The processor 120 may collect context information corresponding to the current state of the electronic device 100. For example, the processor 120 may verify at least one of the current location, current time, battery level, or authentication history of the electronic device 100. Additionally or alternatively, the processor 120 may collect sensor information such as illumination information, temperature information, altitude information, humidity information, and information (e.g., running state, walking state, climbing state, or the like) about whether a user exercises, based on the sensor 170. The processor 120 may select a recognizer suitable for the authentication level verified based on the recognizer operating information 142 and the current context of the electronic device 100. For example, the recognizer may include a processor configured to perform the set at least one authentication method. The processor 120 may collect biometric information by using a biometric sensor set in the selected recognizer or the color camera sensor 180. For example, the processor 120 may select the first recognizer 401 depending on the authentication level and current context information and may collect a color face image by using the color camera sensor 180 based on the first recognizer 401. According to an embodiment, the processor 120 may select the fourth recognizer 404 depending on the authentication level and the current context information and may collect an IR face image or an iris image by using the iris sensor 130 depending on the selected the fourth recognizer 404. Alternatively, the processor 120 may select the specified recognizer and may obtain fingerprint information using the fingerprint sensor 190, based on the corresponding recognizer. In operation 639, the processor 120 may perform authentication based on the currently obtained biometric information and the pre-stored biometric information (e.g., the authentication reference information 141).

In operation 641, the processor 120 may determine whether the authentication is successful. According to an embodiment, the processor 120 may determine whether a difference value between the currently obtained image (or minutiae information extracted from an image or a minutiae distribution model generated based on pieces of minutiae information) and the pre-stored image is not greater than specified threshold value. In the case where a difference value between two images is not greater than the specified threshold value, it may be determined that the authentication is successful. In this case, in operation 643, the processor 120 may execute a function according to authentication success. For example, the processor 120 may execute the function or service utilizing authentication and may output a screen according to the execution of the corresponding function or service, in the display 160. In operation 641, in the case where the authentication fails, the processor 120 may branch to operation 633 and may determine whether the execution of authentication is utilized; afterward, the processor 120 may perform the following procedure or may branch to operation 637 to obtain biometric information for the specified frequency or during a specified time, and may repeatedly perform the following procedure for the specified frequency. According to various embodiments, the processor 120 may output a message according to authentication failure, in the display 160.

As described above, the electronic device 100 may verify the authentication level and may adopt an authentication method suitable for the authentication level; the electronic device 100 may change the authentication method depending on context information. Alternatively, the electronic device 100 may verify the authentication level to adopt the specified authentication method depending on the verification of the authentication level or may substitute the authentication method to be adopted depending on the context information, with another authentication method suitable for the authentication level.

According to various embodiments, the adaptive authentication performing method may include performing, by the electronic device 100, authentication in an authentication method according to the requested authentication level and context information in the case where the authentication level and an authentication method (e.g., iris authentication) which are authentication-requested by the server device 200 are different from an authentication level requested by the electronic device 100, and an authentication method to be performed based on context information, and transmitting, to the server device 200, content (e.g., as a reason for selecting the authentication method, for example, the context information) associated with the authentication method that the electronic device 100 adopted, and an authentication result value.

According to various embodiments, the adaptive authentication performing method may further include an operation of transmitting, by the electronic device 100, content about associated with the result (e.g., the result value of authentication success or authentication failure) of performing authentication, the performed authentication method, the requested authentication level, the authentication level that the electronic device 100 adopts, or the like, to the server device 200 regardless of authentication success or authentication failure. Additionally or alternatively, the adaptive authentication performing method may further include summarizing content about what authentication has fails, in the case where authentication fails in the electronic device 100 and transmitting summary information (e.g., information including a code value indicating authentication failure, a code value indicating an authentication method, a code value indicating an authentication level, or the like) to the server device 200.

According to various embodiments, the processor 120 may determine whether an authentication method of a relatively high authentication level is needed, if an application is executed, and may perform authentication in a specified authentication method in the case where an authentication method is not needed (e.g., account inquiry, balance inquiry, transfer history inquiry, item inquiry, or the like) of a relatively high authentication level is not needed. The processor 120 may collect context information in the case where the authentication method of a relatively high authentication level is needed (e.g., account transfer, item transaction, or the like), and may select an authentication method corresponding to the relatively high authentication level in a current context to perform authentication. For example, in a process of using a financial service, the processor 120 may perform the authentication method based on a first recognizer or a second recognizer in an authentication method associated with account inquiry and may perform an authentication method based on a fourth recognizer or a sixth recognizer in an authentication method associated with account transfer. In this operation, the processor 120 may collect context information and may select a recognizer suitable for context information to perform authentication.

In association with the execution of the above-described function, the server device 200 may transmit relatively low first authentication level information to the electronic device 100 if service use utilizing a relatively low authentication level in a financial service is requested by the electronic device 100, and may transmit relatively high second authentication level information to the electronic device 100 if service use utilizing a relatively high authentication level in a financial service is requested by the electronic device 100.

According to various embodiments, an adaptive authentication performing method according to an embodiment may include receiving authentication level information from at least one application stored in a memory or a server device, selecting one authentication method of a plurality of authentication methods capable of being performed in association with the authentication level or an authentication level higher than the authentication level, based on an authentication method setting table setting at least one authentication method capable of being performed for each authentication level, and performing user authentication based on the selected authentication method.

According to various embodiments, an adaptive authentication performing method according to an embodiment may include receiving authentication level information associated with a function performed by an electronic device, selecting at least one authentication method among the one or more authentication methods based at least on the authentication method setting table associated with one or more authentication methods based at least on the received authentication level information and the authentication level stored in a memory, and performing user authentication based at least on the selected at least one authentication method.

According to various embodiments, the selecting may include obtaining context information including at least one of sensor information (e.g., information about the location of the electronic device, information about an illumination environment, temperature information, altitude information, humidity information, or information about user movement (e.g., running, walking, mountain climbing, or the like)) obtained based on a sensor installed in in the electronic device, device information (e.g., the current usage time or battery level of an electronic device) obtained depending on a hardware operation of the electronic device, or function execution information (e.g., an authentication history or a type of an execution-requested function) obtained depending on the operation of the electronic device and selecting specified at least one authentication method based on the context information.

According to various embodiments, the selecting may include, if a location of the electronic device is within a specified first location range, selecting a first authentication method of a first level range among the one or more authentication methods and, if the location of the electronic device is within a specified second location range, or selecting a second authentication method of a second level range among the one or more authentication methods, based at least on the context information.

According to an embodiment, the selecting may include selecting a first authentication method, the authentication level of which is relatively low, from among the plurality of authentication methods in the case where the location of the electronic device is placed at a first location (e.g., a country or an area where the registration for use of the electronic device is performed), and selecting a second authentication method, the authentication level of which is relatively high, from among the plurality of authentication methods in the case where the location of the electronic device is placed at a second location (e.g., an area other than an area where the electronic device is firstly registered, an area where the electronic device is not used, or a roaming area).

According to various embodiments, the selecting may include, if a current usage time of the electronic device is within a first time range, selecting a first authentication method of a specified first level range among the one or more authentication methods, and, if the current usage time of the electronic device is within a second time range, selecting a second authentication method of a specified second level range among the one or more authentication methods, based at least on the context information.

According to an embodiment, the selecting may include, if the current usage time of the electronic device is within a first time range (e.g., an interval, the illuminance of which is not less than a specified illuminance, or daytime), selecting the first authentication method, the authentication level of which is relatively low, from among the plurality of authentication methods, and, if the current usage time of the electronic device is within a second time range (e.g., an interval, the illuminance of which is less than a specified illuminance, or nighttime), selecting the second authentication method, the authentication level of which is relatively high, from among the plurality of authentication methods.

According to various embodiments, the selecting may include, if an external illuminance of the electronic device is within a first illuminance range, selecting a first authentication method based on an image sensor operable in the first illuminance range, and, if the external illuminance of the electronic device is within a second illuminance range, selecting a second authentication method based on an image sensor operable in the second illuminance range, based at least on the context information.

According to an embodiment, the selecting may include, in the case where the external illuminance of the electronic device is within a first illuminance range (e.g., daytime, the illuminance of which is not less than a specified illuminance, or outdoor environment), selecting a first authentication method based on an image sensor operable in a relatively high illuminance value, and, in the case where the external illuminance of the electronic device is within a second illuminance range (e.g., nighttime, the illuminance range of which is less than the first illuminance range, or indoor environment), selecting a second authentication method based on an image sensor operable in a relatively low illuminance value.

According to an embodiment, the selecting may include, if a battery level of the electronic device is not less than a first threshold value, selecting a first authentication method of a first power consumption range, and, if the battery level of the electronic device is less than the first threshold value, selecting a second authentication method of a second power consumption range, based at least on the context information.

According to an embodiment, the selecting may include selecting a first authentication method of a first power consumption range (e.g., the power consumption is greater than the power consumption of the second authentication method) in the case where the battery level of the electronic device is not less than a first threshold value, or selecting a second authentication method of a second power consumption range (e.g., the power consumption is less than the power consumption of the first authentication method) in the case where the battery level of the electronic device is less than the first threshold value.

According to an embodiment, the selecting may include verifying an authentication history of the electronic device and selecting an authentication method corresponding to a relatively high authentication level based on a length of time elapsed after a point in time when authentication is successful, based at least on the context information.

According to an embodiment, the selecting may include verifying an authentication history of the electronic device and selecting an authentication method corresponding to a relatively high authentication level based on a length of time elapsed after a point in time when authentication is successful (e.g., after authentication for unlocking a lock screen is successful or after authentication associated with the execution of a specified function is successful).

According to an embodiment, the selecting may include outputting a list for selecting at least one authentication method, which is based at least on the one or more biometric sensors, from among the one or more authentication methods and performing an authentication method selected from the list, based at least on the context information.

According to an embodiment, the selecting may include outputting a list for selecting at least one authentication method, which is suitable for the authentication level, from among a plurality of authentication methods based on a plurality of sensors included in the biometric sensor and selecting an authentication method in response to a user input.

According to various embodiments, the adaptive authentication performing method may include transmitting context information in a state where the specified authentication method is performed, to the server device or outputting guide information associated with the result of performing authentication or the context information by using the display, based on the authentication execution result of a specified authentication method.

Figure 6C:
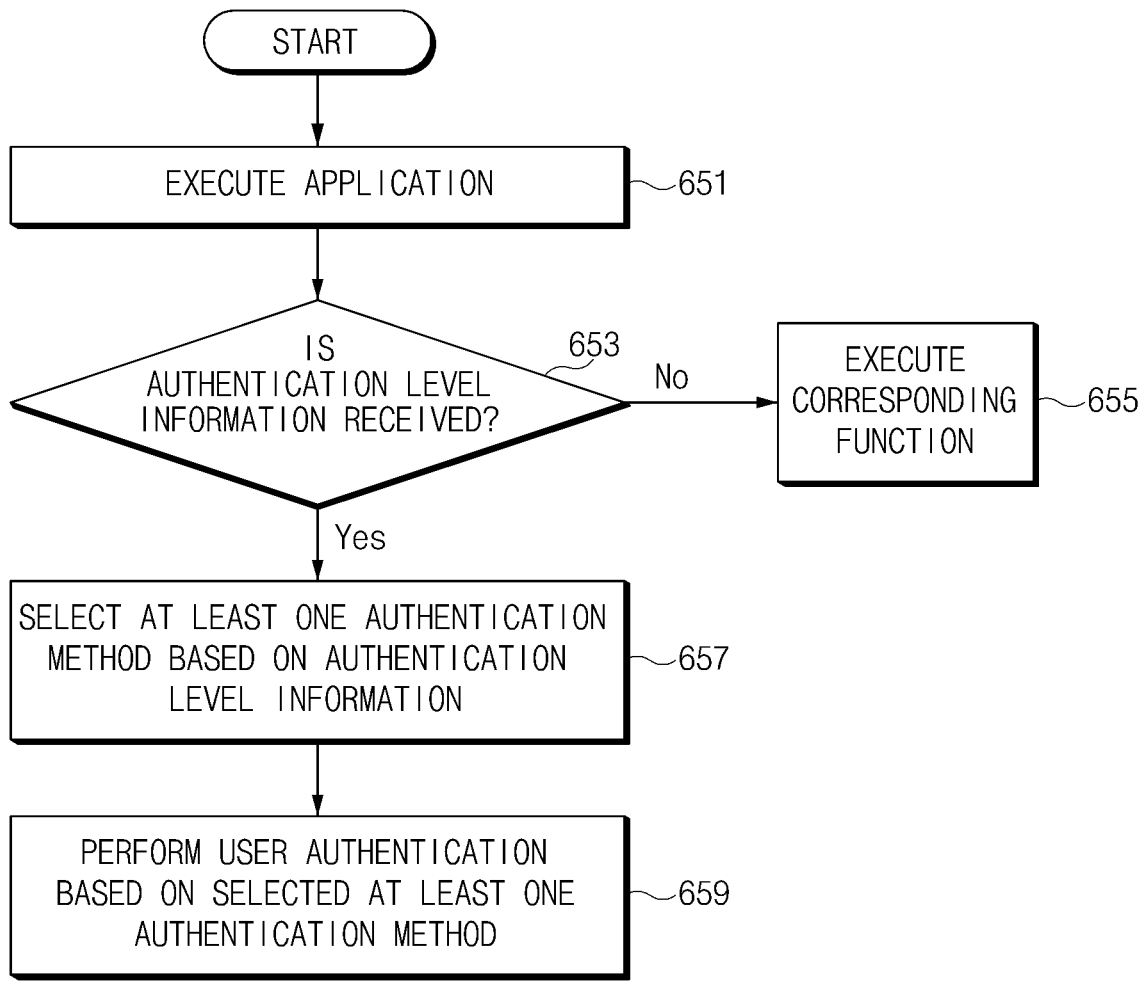
FIG. 6C is a flowchart illustrating an example of an adaptive authentication performing method based on authentication level information, according to an embodiment of the present disclosure.

FIG. 6C is a flowchart illustrating an example adaptive authentication method based on authentication level information, according to an embodiment of the present disclosure.

Referring to FIG. 6C, in operation 651, the processor 120 may execute an application in response to detecting or receiving a user input, based on a set schedule information, or in response to detecting or receiving a request from an external device.

In operation 653, the processor 120 may determine whether authentication level information is received. The authentication level information may indicate an authentication level value requested, with respect to the execution of at least one function (or service) of the application. In the case where the authentication level information is not received, in operation 655, the processor 120 may execute a function according to an event that has occurred. For example, the processor 120 may execute a function (e.g., a call function, a web search function, or the like) associated with the execution of an application, depending on an event type without the execution of separate authentication.

If the authentication level information is received, in operation 657, the processor 120 may select at least one authentication method based on authentication level information. In this regard, the electronic device 100 may store and manage an authentication method setting table (e.g., the recognizer operating information). The processor 120 may select at least one authentication method with reference to the authentication method setting table. According to various embodiments, with regard to the selection of the authentication method, the processor 120 may select and operate at least one authentication method that corresponds to an authentication level at least higher than the authentication level requested by an application.

In operation 659, the processor 120 may perform user authentication based on the selected at least one authentication method. If the authentication is successful, the processor 120 may perform the execution-requested function. If the authentication fails, the processor 120 may output guide information (e.g., a notification or a prompt) associated with authentication failure and allow the authentication to be reattempted. Reattempts may in some embodiments be limited to a prespecified frequency (e.g., a certain number of tries) or during a prespecified time (e.g., in which the correct authentication information must be provided). After the authentication fails, the processor 120 may maintain a state (e.g., sleep state) before the authentication is requested, or a state where a screen for requesting the authentication is output, depending on a user input. Additionally or alternatively, the processor 120 may transmit information (e.g., whether authentication is successful, a type of the performed authentication method, or the like) associated with authentication success or failure to an external device (e.g., the server device 200).

Figure 7:
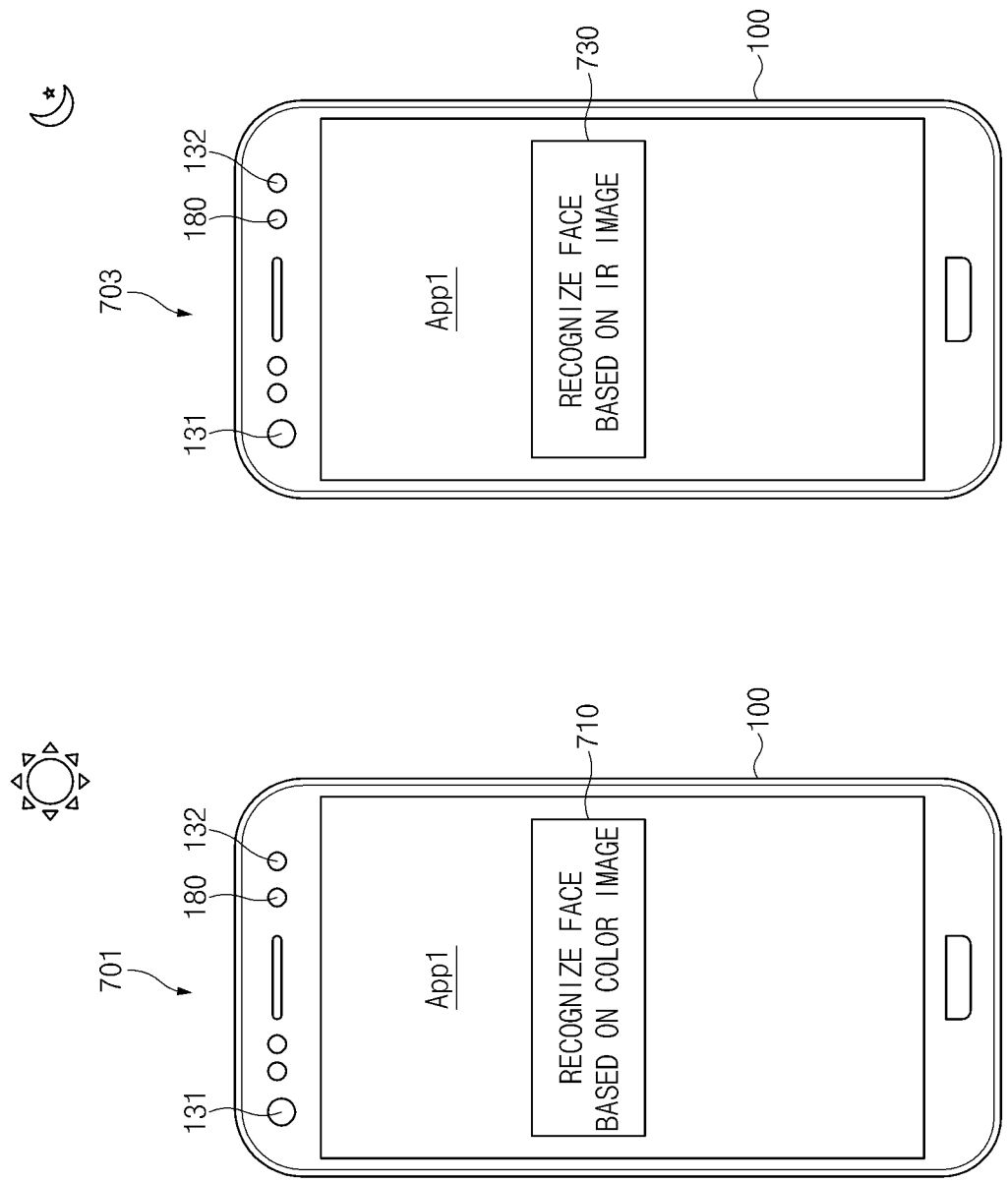
FIG. 7 is a view illustrating an operating example of an electronic device associated with execution of adaptive authentication according to an external illuminance environment, according to an embodiment of the present disclosure.

FIG. 7 is a view illustrating an operating example of an electronic device associated with execution of adaptive authentication according to an external illuminance environment, according to an embodiment of the present disclosure.

Referring to FIG. 7, with regard to the execution of adaptive authentication, as illustrated in state 701, the electronic device 100 may output a screen according to the execution of a first application App_1, in the display 160. The first application App_1 may request a first authentication level in response to detecting execution of the specified function. Alternatively, the server device 200 supporting the first application App_1 may request the first authentication level associated with the operation of the first application App_1. For example, the first authentication level may include authentication based on user face recognition. For example, facial recognition-based authentication may include using a color face image obtained based on the color camera sensor 180, and a method using an IR face image obtained based on the iris sensor 130. According to various embodiments, the facial recognition authentication method using the color face image may be associated for operation with the first authentication level. The face recognition authentication method using the IR face image may be associated for operation with the first authentication level or a second authentication level, the security of which is higher than the security of the first authentication level.

If the first authentication level is requested from the first application App_1 or the server device 200, the processor 120 of the electronic device 100 may collect specified context information, for example, indicating an amount of external illuminance information by using the sensor 170. As illustrated in state 701, in the case where the current environment is detected as a bright outdoor environment (and/or at a particular time, such as at noon) in which the external illuminance value is not less than (e.g., equal or greater than) a specified illuminance value, the processor 120 may obtain a color face image based on the color camera sensor 180. The processor 120 may perform authentication based on face recognition corresponding to the first authentication level, based on the obtained color face image. In this operation, the processor 120 may output first guide information 710 indicating that performing authentication based on the color camera sensor 180. According to various embodiments, the processor 120 may skip the output of the first guide information 710.

According to various embodiments, in a state where the first authentication level is requested by the first application App_1 or the server device 200, as illustrated in state 703, the processor 120 may obtain information indicating an indoor environment (and/or at a dark, evening time) in which an external illuminance is less than the specified illuminance value, as the context information of the electronic device 100. In this case, the processor 120 may obtain an IR image based on the iris sensor 130. The processor 120 may perform authentication based on face recognition corresponding to the first authentication level (or corresponding to the second authentication level higher than the first authentication level), based on the obtained IR image. In this operation, the processor 120 may output second guide information 730 indicating that performing authentication based on the iris sensor 130. According to various embodiments, the processor 120 may skip output of the second guide information 730.

As described above, the processor 120 may change and perform the authentication method according to the authentication level that the execution-requested application or the server device 200 requests, in association with the context information of the electronic device 100. For example, the processor 120 may perform authentication based on a color face image, depending on the request for the first authentication level in an environment in which an image is relatively easily obtained based on the color camera sensor 180; and the processor 120 may perform authentication based on an IR face image, depending on the request for the first authentication level in an environment in which an image is relatively easily obtained based on the iris sensor 130. According to various embodiments, with regard to the requested authentication level, in the case where other replaceable authentication methods are not present, the processor 120 may select the authentication method having relatively high security. For example, the face recognition method based on the IR image may be set to the relatively high authentication level higher than the authentication level of the authentication method based on an RGB image. In this case, the processor 120 may perform authentication using the iris sensor 130 in an illumination environment unsuitable for operating the color camera sensor 180.

According to various embodiments, in conjunction with a specific authentication method, the processor 120 may select an alternative authentication method of the type that reduces (or minimizes) the change in the operation of the electronic device 100. For example, since the color camera sensor 180 and the iris sensor 130 are disposed on the front surface of the electronic device 100, the user posture for obtaining an RGB image through the color camera sensor 180 may be similar to the user posture for obtaining an IR image through the iris sensor 130. As such, the processor 120 may operate an authentication method based on the iris sensor 130, the authentication level of which is equal to or higher than the requested authentication level, in a state (e.g., an illuminance environment in which an image with a specific sharpness or more is not capable of being obtained for authentication or an environment in which the RGB image estimated to have a high failure rate is obtained) where it is impossible or difficult to operate an authentication method using the color camera sensor 180.

According to various embodiments, the processor 120 may apply an alternative authentication method to audio fingerprint recognition and fingerprint recognition. For example, the electronic device 100 may provide an environment capable of collecting a voice, in a state where a specified button is pressed for the audio fingerprint recognition. The electronic device 100 may provide an environment capable of collecting fingerprint information while a finger contacts the specified button for the fingerprint recognition. As such, if it is impossible to obtain utterance information associated with the audio fingerprint recognition or if a noise is great, the processor 120 may automatically adopt the authentication method based on the fingerprint recognition to perform authentication.

According to various embodiments, in the case where the authentication method is changed depending on the context information, the processor 120 may provide the server device 200 with information about authentication including at least one of the requested authentication level information, the context information of the electronic device 100, the selected authentication method information, or the authentication result according to the selected authentication method. Alternatively, the processor 120 may provide the information about authentication to a server device associated with the first application App_1.

As described above, while the server device 200 requests color face authentication corresponding to the first authentication level, in the case where the electronic device 100 performs the login through an application associated with the use of the corresponding server device 200, the electronic device 100 may measure an external illuminance and may perform IR face authentication instead of the color face authentication while maintaining the current UX, in the case where the external illuminance is less than a specified threshold value (e.g., night or dark indoor environment). While providing the server device 200 with the authentication execution result, the electronic device 100 may provide the server device 200 with information indicating that the authentication execution result is the result according to the IR face authentication.

Figure 8:
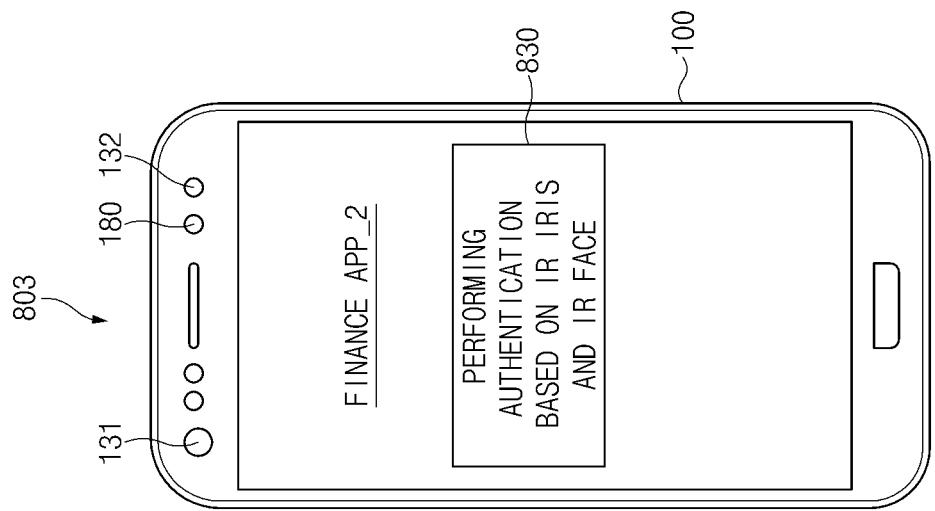
FIG. 8 is a view illustrating an operating example of an electronic device associated with execution of adaptive authentication according to a location, according to an embodiment of the present disclosure.
Figure 8:
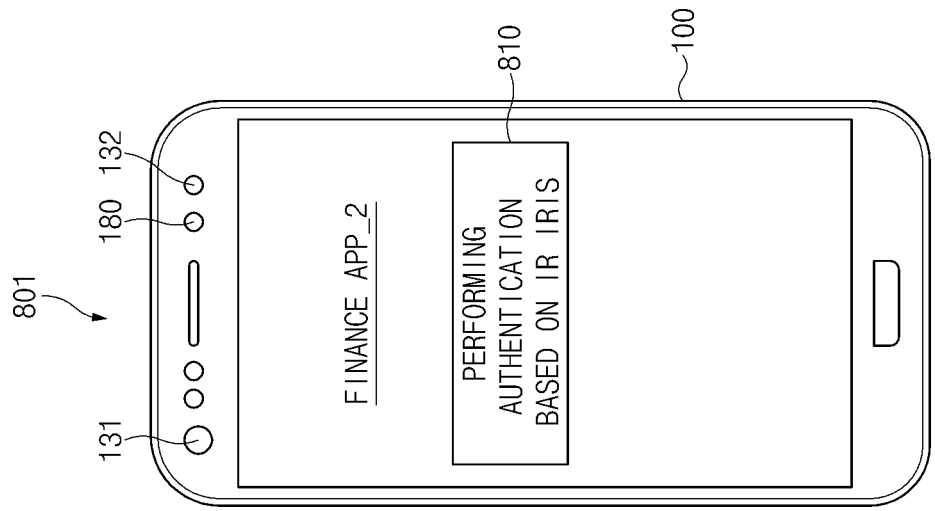

FIG. 8 is a view illustrating an operating example of an electronic device associated with execution of adaptive authentication according to a location, according to an embodiment of the present disclosure.

Referring to FIG. 8, with regard to the execution of adaptive authentication, the electronic device 100 may output a screen according to the execution of a second application App_2, in the display 160. For example, the second application App_2 may include an application associated with a financial service utilizing relatively high security. The second application App_2 may request a third authentication level in response to the execution of the specified function. Alternatively, the server device 200 supporting the second application App_2 may request the third authentication level in association with the operation of the second application App_2. For example, the third authentication level may include the authentication method performing authentication based on an IR iris. If the third authentication level is requested, the processor 120 may collect the context information of the electronic device 100, for example, location information. In this regard, the processor 120 may activate a location information collection sensor or may collect location information based on information about a base station or an access point (AP) with which the communication circuit 110 establishes a communication channel. In the case where the obtained location information indicates a specified first location (e.g., such as the country of Korea), the processor 120 may activate the iris sensor 130 and may perform authentication comparing the obtained iris image with the pre-stored iris image after obtaining the iris image of a user. In this operation, as illustrated in state 801, the processor 120 may output third guide information 810 indicating IR iris-based authentication, in the display 160. The processor 120 may skip the output of the third guide information 810.

According to various embodiments, as illustrated in state 803, the processor 120 may collect a second location (e.g., such as the nation of the Philippines) as current location information. In a state where the third authentication level is requested by the second application App_2 or the server device 200, if the current location is the second location, the processor 120 may activate the iris sensor 130 and may detect an iris image and an IR face image from the obtained IR image. The processor 120 may perform authentication on each of the detected iris image and the detected IR face image. The security in which the authentication is performed based on each of the iris image and the IR face image may be higher than the security (e.g., a fourth authentication level) of a method performing authentication based on the above-described iris image. With regard to the change in the authentication level, the processor 120 may output fourth guide information 830 for guiding that the authentication method according to the changed authentication level is being performed, in the display 160. According to various embodiments, the processor 120 may skip the output of the fourth guide information 830.

As described above, in the case where the processor 120 operates the second application App_2 at a location (e.g., Korea) in which the electronic device 100 is registered, the processor 120 may perform the authentication method according to the third authentication level; in the case where the processor 120 operates the second application App_2 in an area (e.g., Philippines) in which the electronic device 100 is not registered, the processor 120 may perform the authentication method according to the relatively high fourth authentication level. In the case where the authentication level utilized by the server device 200 or the like is changed, the processor 120 may provide the server device 200 with information about authentication including at least one of information associated with the changed authentication level, context information of the electronic device 100, a type of an authentication method selected at the changed authentication level, or the authentication execution result.

The first location and the second location given in the above-described details may be changed depending on the usage history, user settings, or the like of the electronic device 100. Alternatively, the first location and the second location may be changed depending on the policy of the server device 200. For example, the first location utilizing the relatively low authentication level may be a country or an administrative area where the electronic device 100 is mainly used, and the second location may be an area where the electronic device 100 has been used within a specified time or a country or an administrative region selected by roaming. Alternatively, the first location may be a country or an administrative area where the second application App_2 is installed, and the second location may be a country or an administrative area at a location spaced apart from the country or the administrative area where the second application App_2 is registered when being installed, by a specified distance or more.

According to various embodiments, the processor 120 may complexly collect context information and may select and operate the authentication method depending on the collected context information. For example, in the case where the electronic device 100 is in a first illuminance environment (or a first time) and is placed at a first location (e.g., Korea), the processor 120 may perform face authentication based on a color face image, as a first authentication level; in the case where the electronic device 100 is in the first illuminance environment and is placed at a second location (e.g., Philippines), the processor 120 may perform face authentication based on an IR image, as a second authentication level. According to various embodiments, in the case where the electronic device 100 is in a second illuminance environment (or a second time) and is placed at a first location, the processor 120 may perform authentication based on an IR iris image and face authentication based on a color face image, as a third authentication level. According to various embodiments, in the case where the electronic device 100 is in the second illuminance environment (or the second time) and is placed at a second location, the processor 120 may perform authentication based on an IR iris image and fingerprint authentication, as a fourth authentication level. The change in the authentication method or the change in the authentication level for each complex context information may be not limited to the detailed descriptions, and may be changed depending on settings.

Figure 9:
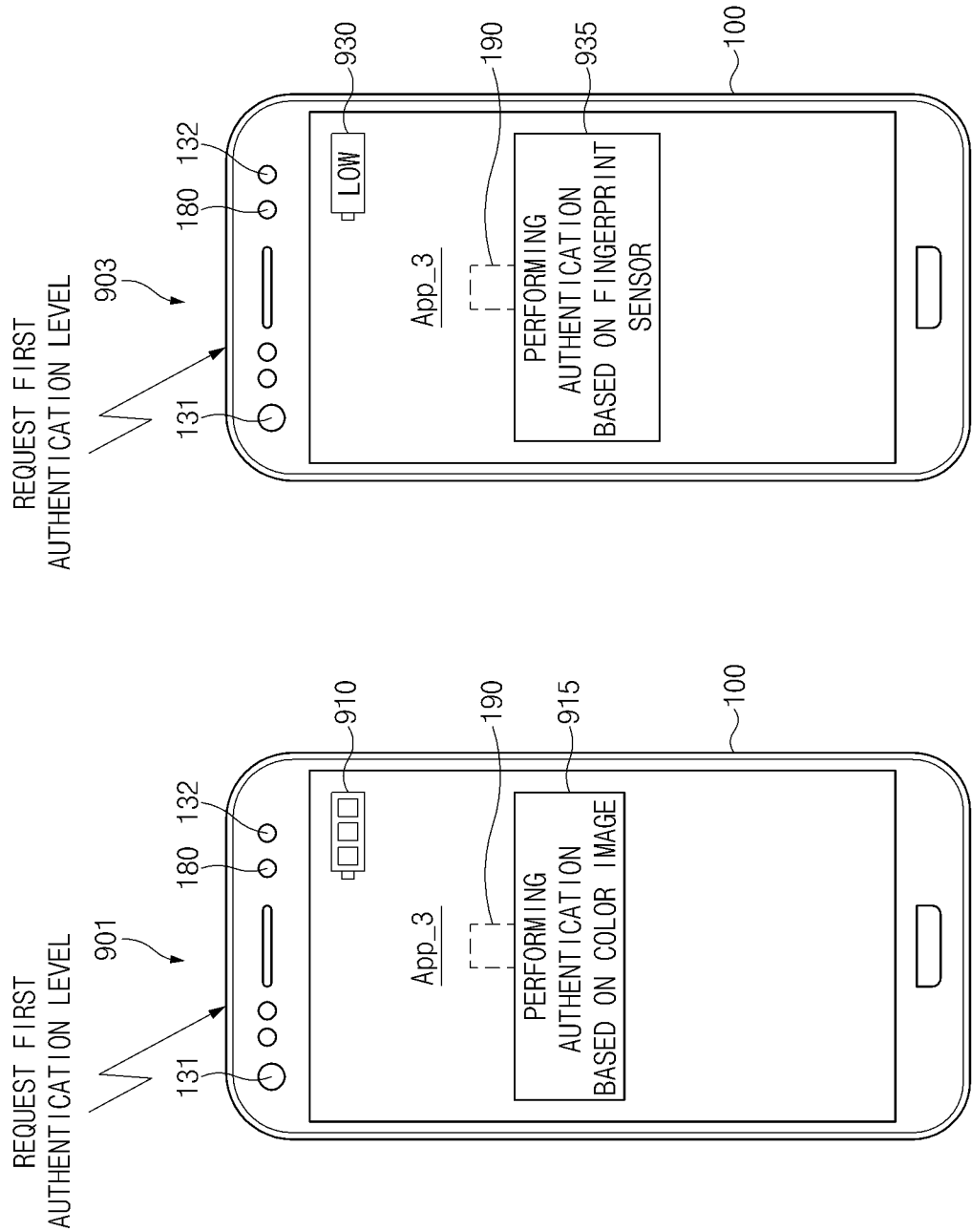
FIG. 9 is a view illustrating an operating example of an electronic device associated with execution of adaptive authentication according to an operating state of an electronic device, according to an embodiment of the present disclosure.

FIG. 9 is a view illustrating an operating example of an electronic device associated with execution of adaptive authentication according to an operating state of an electronic device, according to an embodiment of the present disclosure.

Referring to FIG. 9, the electronic device 100 may execute a third application App_3 in response to a user input or specified scheduling information. The electronic device 100 may output a third application execution screen in the display 160, in response to the execution of the third application App_3. In this operation, the electronic device 100 may receive authentication level information from a server device associated with the third application App_3 or the execution of the third application App_3. For example, the authentication level information may include level information of authentication associated with the execution of the third application App_3 or authentication associated with the use of a function or service that the third application App_3 provides. According to an embodiment, the authentication level information may include information for requesting a first authentication level in association with the execution of the third application App_3. If receiving a request for the authentication of the first authentication level from the third application App_3 or the relevant server device, the processor 120 may verify the battery level of the electronic device 100. If the battery level of the electronic device 100 is not less than a first reference value, as illustrated in state 901, the processor 120 receiving the request for the first authentication level may perform authentication based on a color face image. In this operation, the electronic device 100 may output a first battery level display object 910 indicating the battery level of a first reference value or more. The processor 120 may activate the color camera sensor 180 in association with the first authentication level and may perform authentication based on the obtained RGB image. The processor 120 may output fifth guide information 915 indicating that authentication is being performed based on the color face image, in the display 160. The output of the fifth guide information 915 may be omitted.

In the case where the battery level of the electronic device 100 is less than a specified first reference value, as illustrated in state 903, the processor 120 may operate a fingerprint authentication method with relatively low battery consumption upon performing the authentication. In this regard, the processor 120 may activate the fingerprint sensor 190 and may perform fingerprint authentication based on the obtained fingerprint information. In this operation, the electronic device 100 may output a second battery level display object 930 indicating the battery level that is less than the first reference value. The processor 120 may output sixth guide information 935 indicating that the authentication based on a fingerprint sensor is being performed in association with a first authentication level, in the display 160. The output of the sixth guide information 935 may be omitted.

As described above, while satisfying the requested authentication level, the electronic device 100 may select an authentication method with relatively low battery consumption, depending on a battery level. For example, the authentication level satisfaction condition may include a condition that operates the authentication method, the authentication level of which is not less than the authentication level that an application or a server device requests. With regard to the support of the above-described function, the electronic device 100 may store and manage a setting table defining authentication methods to be performed for each authentication level and for each context information. According to various embodiments, in a state where the authentication level utilized by the server device 200 is a second authentication level, when the electronic device 100 performs the login based on a financial application associated with the use of the corresponding server device 200, the electronic device 100 may perform IR face authentication and IR iris authentication of the second authentication level or more. However, to save battery power, the electronic device 100 may perform the IR face authentication with relatively low battery consumption. Additionally, if a transfer function is requested by a financial application, the server device 200 may request (e.g., request a third authentication level) additional authentication; the electronic device 100 may simultaneously perform IR face authentication and IR iris authentication, in association with additional authentication; while providing the result to the server device 200, the electronic device 100 may provide the server device 200 with additional information (e.g., ambient brightness information, face color information, information of user pose or the like). The server device 200 may update an authentication information database (DB) based on the received additional information.

Figure 10:
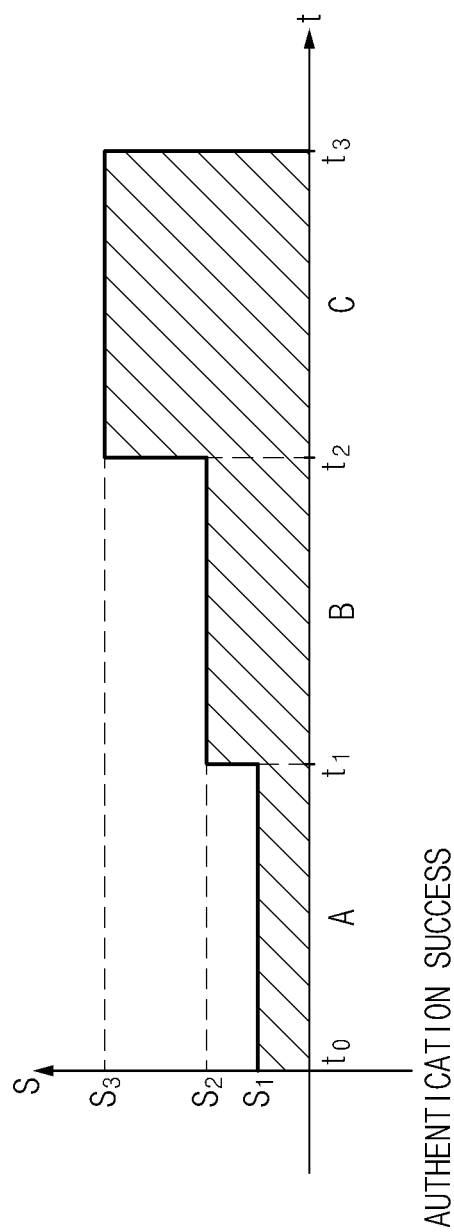
FIG. 10 is a view for describing authentication performing completion and an adaptive authentication performing method with time, according to an embodiment of the present disclosure.

FIG. 10 is a view illustrating authentication performing completion, and an adaptive authentication performance over time, according to an embodiment of the present disclosure.

Referring to FIG. 10, the processor 120 of the electronic device 100 may adjust an authentication level according to the time elapsed after point in time when authentication is successful. For example, if authentication succeeds for a particular function at time t0, when a function utilizing the authentication is executed, the processor 120 may perform an authentication method corresponding to a first authentication level S1 in section A (t0~t1), perform an authentication method corresponding to a second authentication level S2 in section B (t1~t2), and perform an authentication method corresponding to a third authentication level S3 in section C (t2~t3). Section "B" may thus be a second tier of authentication executed after a preset time for section "A" has lapsed, and section "A" may refer to a first tier of authentication executed starting from a point in time after detecting authentication is successful. Section "C" may utilize a third tier of authentication after the times for both section "B" and section "A" have lapsed. As described above, the electronic device 100 may be configured to increase the authentication level to be performed as time elapses after a point in time when authentication is successful.

According to various embodiments, based on a point in time when authentication is successful, the processor 120 may perform an authentication method, the authentication level of which is the same as the authentication level of the execution-requested application or may perform an authentication method of the relatively low or high authentication level. For example, if the authentication of a first authentication level is requested at a time point in section A after authentication is successful, the processor 120 may perform the authentication method suitable for the first authentication level. If the authentication of the first authentication level is requested at a time point in section B after authentication is successful, the processor 120 may perform the authentication method suitable for the second authentication level. If the authentication of the first authentication level (or the second authentication level, the security of which is higher than the security of the first authentication level) is requested at a time point in section C after authentication is successful, the processor 120 may perform the authentication method suitable for the third authentication level.

Figure 11:
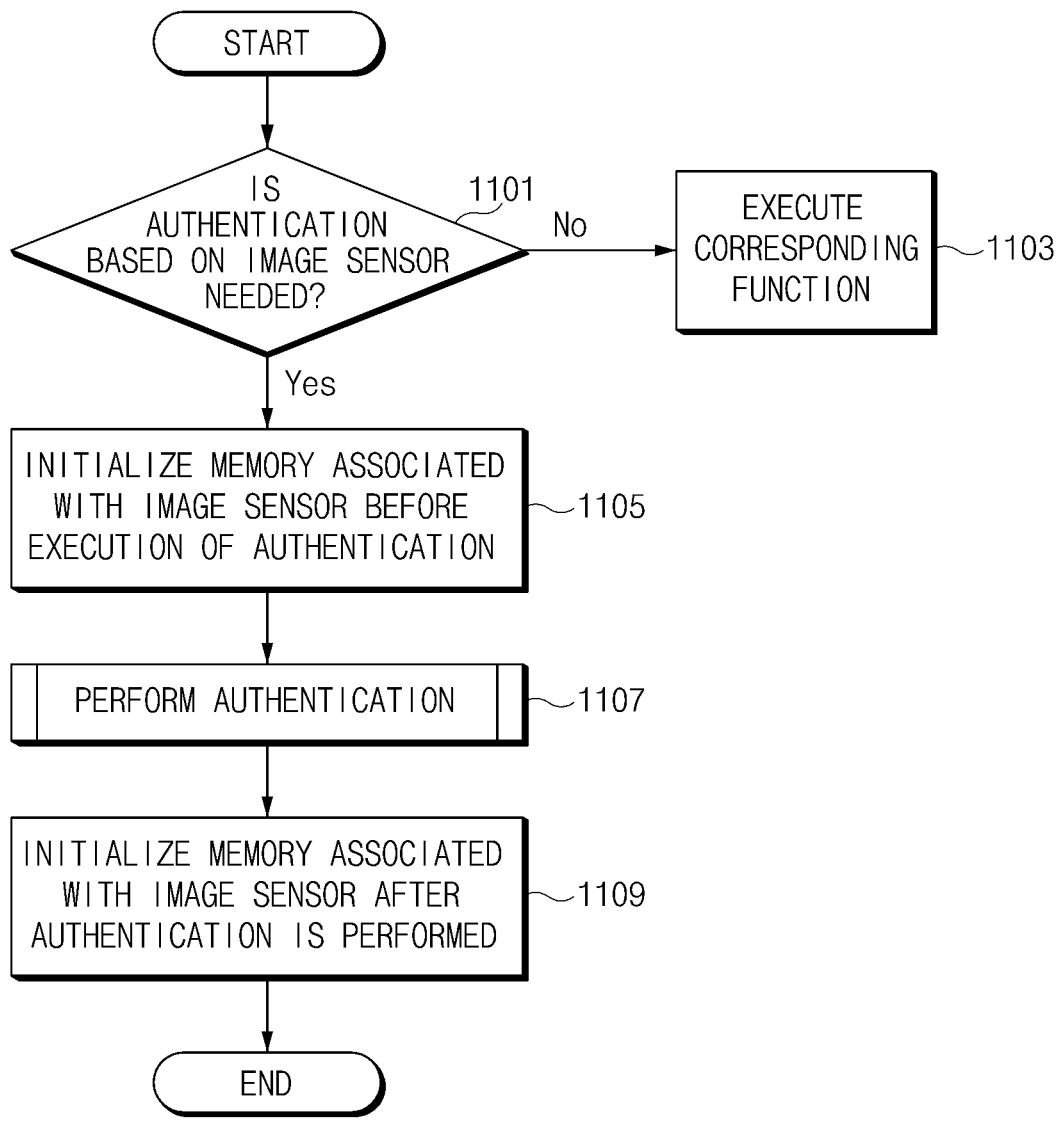
FIG. 11 is a flowchart illustrating an example of an image sensor operating method associated with execution of adaptive authentication, according to an embodiment of the present disclosure.

FIG. 11 is a flowchart illustrating an example image sensor operating method associated with execution of adaptive authentication, according to an embodiment of the present disclosure.

Referring to FIG. 11, in association with an operating method of an image sensor (e.g., the color camera sensor 180 or the iris sensor 130), in operation 1101, the processor 120 may determine whether authentication based on an image sensor is requested. For example, the image sensor may include the color camera sensor 180, the iris sensor 130, or the like. In the case where the authentication based on the image sensor is not requested, in operation 1103, the processor 120 may execute the corresponding function. For example, the processor 120 may execute a function selected or activated in response to a user input.

In the case where the authentication based on the image sensor is requested, in operation 1105, the processor 120 may initialize a memory associated with the image sensor before the execution of the authentication. According to an embodiment, if a color face authentication method based on the color camera sensor 180 is determined depending on the request for the first authentication level, the processor 120 may initialize a first buffer 411 connected to the color camera sensor 180. According to various embodiments, if an authentication method based on the iris sensor 130 is determined depending on whether the request is for the first authentication level or the second authentication level, the processor 120 may initialize the second buffer 431 connected to the iris sensor 130. According to various embodiments, if an authentication method in which both the color camera sensor 180 and the iris sensor 130 are used is selected, depending on the request for the specified authentication level, the processor 120 may initialize the first buffer 411 and the second buffer 431.

In operation 1107, the processor 120 may perform authentication. For example, the processor 120 may store an image currently obtained through the color camera sensor 180 or the iris sensor 130, in the initialized memory. The processor 120 may compare the stored, currently obtained image with the authentication reference information 141 pre-stored in the memory to determine whether authentication is successful.

In operation 1109, the processor 120 may initialize the memory associated with the image sensor after authentication is performed. For example, in the case where the authentication is performed based on the color camera sensor 180, the processor 120 may initialize the first buffer 411. Alternatively, in the case where the authentication is performed based on the iris sensor 130, the processor 120 may initialize the second buffer 431. Alternatively, in the case where both the color camera sensor 180 and the iris sensor 130 are used, the processor 120 may initialize both the first buffer 411 and the second buffer 431.

Figure 12:
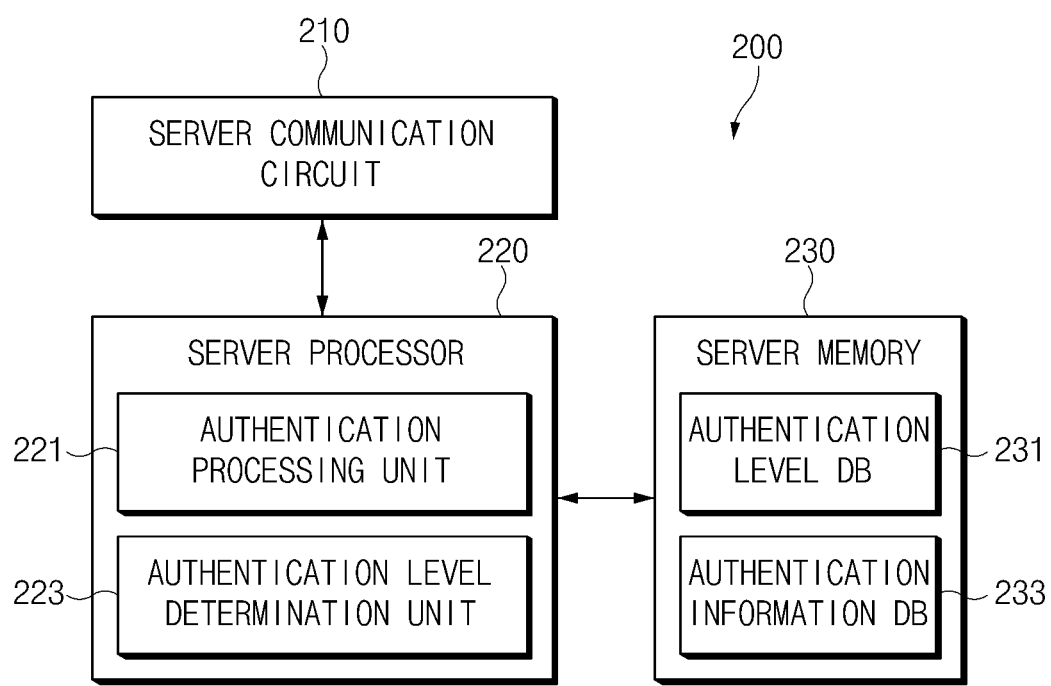
FIG. 12 is a block diagram illustrating an example of a configuration of a server device, according to an embodiment of the present disclosure.

FIG. 12 is a block diagram illustrating an example of a configuration of a server device, according to an embodiment of the present disclosure.

Referring to FIG. 12, the server device 200 according to an embodiment of the present disclosure may include a server communication circuit 210, a server memory 230, and a server processor 220.

The server communication circuit 210 may establish a communication channel with the electronic device 100 through the network 11. The server communication circuit 210 may transmit a virtual page to the connected electronic device 100. Alternatively, the server communication circuit 210 may receive, from the electronic device 100, information such as a type of the execution-requested application, a type of a function or a service that the application supports, or the like and may transmit authentication level information corresponding to the received information to the electronic device 100 under control of the server processor 220. If receiving the authentication execution result (e.g., whether the authentication is successful or context information of the electronic device 100) from the electronic device 100, the server communication circuit 210 may transmit the authentication execution result to the server processor 220.

The server memory 230 may store data associated with the authentication function of the electronic device 100. For example, the server memory 230 may store an authentication level DB 231 and an authentication information DB 233. The authentication level DB 231 may include authentication level information that needs to be performed depending on a type of the electronic device 100, a type of an application being executed by the electronic device 100, type information of a function or a service execution-requested by the application being executed, or the like. The authentication information DB 233 may include context information for each electronic device 100 and authentication history information for each electronic device 100.

The server processor 220 may include an authentication processing unit 221 and an authentication level determination unit 223. The authentication processing unit 221 and the authentication level determination unit 223 may be provided as at least one hardware processor or may be provided as at least part of one processor.

The authentication processing unit 221 may process authentication according to the request of the electronic device 100. For example, if receiving account information and whether user authentication is successful, from the connection-requested electronic device 100, the authentication processing unit 221 may allow information associated with a function or a service that the corresponding electronic device 100 requests, to be transmitted to the electronic device 100. For example, if receiving a specified financial service execution request and user authentication success information from the electronic device 100, the authentication processing unit 221 may execute the corresponding financial service and may provide the electronic device 100 with the result according to the execution of the corresponding financial service. In this operation, the authentication processing unit 221 may determine the validity of whether the user authentication provided by the user is successful. For example, the authentication processing unit 221 may determine whether the authentication succeeds in a specified authentication method corresponding to the authentication level that is not less than the authentication level provided by the electronic device 100. In the case where the authentication succeeds in the specified authentication method, the authentication processing unit 221 may execute the requested function or service. In the case where the authentication does not succeed in the specified authentication method, the authentication processing unit 221 may transmit the authentication level to the electronic device 100 again, and may request the electronic device 100 to perform the authentication method corresponding to the authentication level that is not less than the transmitted authentication level.

The authentication level determination unit 223 may determine an authentication level depending on a type a function or service that the electronic device 100 execution-requests. For example, the authentication level determination unit 223 may transmit first authentication level information to the electronic device 100 upon requesting the execution of a financial application. The authentication level determination unit 223 may transmit second authentication level information to the electronic device 100, upon requesting a balance inquiry function among financial application functions. The authentication level determination unit 223 may transmit third authentication level information to the electronic device 100, upon requesting the execution of a transfer function among financial application functions. An embodiment in which different authentication levels are provided for each financial application function is one example, and thus embodiments of the present disclosure are not limited thereto. For example, the authentication level determination unit 223 may differently determine an authentication level depending on a type (or the number of authentication methods (e.g., authentication using an iris sensor, authentication using a color camera sensor, the use of a fingerprint sensor, audio fingerprint authentication, or the like) capable of being performed by the electronic device 100 or a type of an authentication method) of the electronic device 100, a type of the execution-requested application, or the like.

According to various embodiments, the authentication level determination unit 223 may make a request for context information to the electronic device 100 and may adjust an authentication level depending on the provided context information. For example, in the case where the electronic device 100 accesses the server device 200, the authentication level determination unit 223 may request and receive the specified context information (e.g., the current location of the electronic device 100, a time at a current location, whether authentication of a specified authentication method is successful (e.g., iris authentication for unlocking a lock screen, or the like), a point in time when the authentication of a specified authentication method is successful, battery level information, an authentication failure frequency, or the like) from the electronic device 100. The authentication level determination unit 223 may differently determine the authentication level depending on the received context information of the electronic device 100. For example, in the case where the electronic device 100 is placed at a first location, the authentication level determination unit 223 may make a request for the authentication method of the first authentication level to the electronic device 100; in the case where the electronic device 100 is placed at a second location, the authentication level determination unit 223 may make a request for the authentication method of the second authentication level to the electronic device 100. According to various embodiments, in the case where the usage time of the electronic device 100 is 10:00 AM, the authentication level determination unit 223 may make a request for the authentication method of the first authentication level to the electronic device 100; in the case where the usage time of the electronic device 100 is 4:00 AM, the authentication level determination unit 223 may make a request for the authentication method of the second authentication level to the electronic device 100. According to various embodiments, as the authentication failure frequency increases, the authentication level determination unit 223 may make a request for the authentication method of relatively high authentication level to the electronic device 100. In this regard, the authentication level determination unit 223 may transmit authentication level information including the requested authentication level value, to the electronic device 100.

According to various embodiments, if receiving the authentication execution result from the electronic device 100, the authentication level determination unit 223 may verify context information about a context in which authentication is performed, from the authentication execution result. In the case where the context information satisfies a specified condition, the authentication level determination unit 223 may provide the electronic device 100 with a new authentication level and may request the execution of the authentication method corresponding to the corresponding authentication level again. According to an embodiment, the server device 200 may provide first authentication level information when the application of the electronic device 100 is executed; the server device 200 may obtain the context information of the electronic device 100 when the authentication execution result according to the first authentication level is received. If the execution of the specified function or service of the application is requested, the authentication level determination unit 223 may adjust the authentication level based on the collected context information and may transmit the adjusted authentication level information to the electronic device 100. In this operation, the authentication level determination unit 223 may transmit, to the electronic device 100, information including the authentication level, which is lower or higher than the previously requested authentication level, depending on the collected context information.

Figure 13:
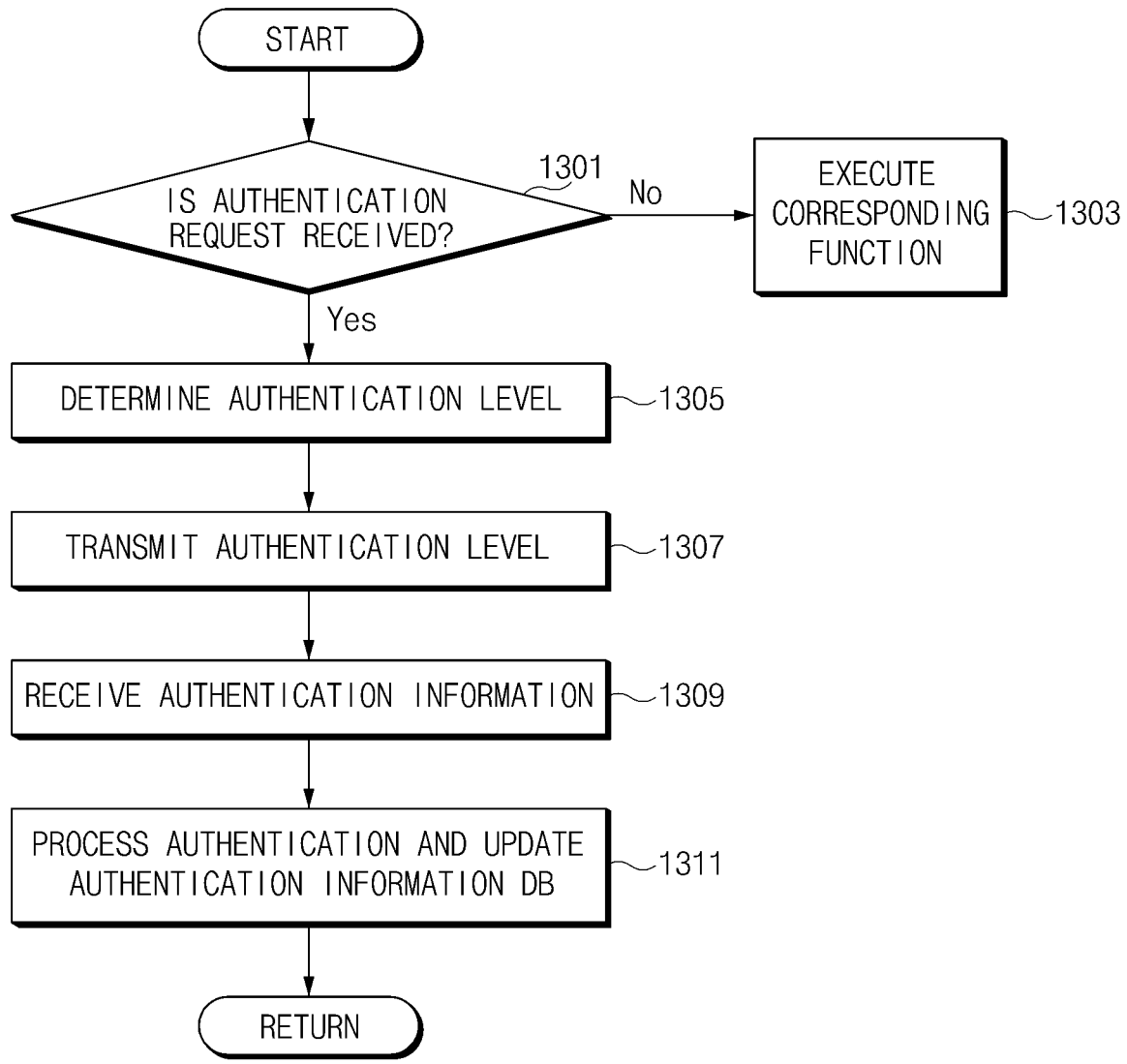
FIG. 13 is a flowchart illustrating an example of a server device operating method associated with execution of adaptive authentication, according to an embodiment of the present disclosure.

FIG. 13 is a flowchart illustrating an example of a server device operating method associated with execution of adaptive authentication, according to an embodiment of the present disclosure.

Referring to FIG. 13, in operation 1301, the server processor 220 may determine whether an authentication request has been received from the electronic device 100. In the case where the authentication request is not received, in operation 1303, the server processor 220 may execute a specified function. For example, the server processor 220 may execute a standby state in which the electronic device 100 awaits access to a server, and/or may provide non-sensitive information that does not utilize separate authentication, in response to the request of the electronic device 100.

If the authentication request is received, in operation 1305, the server processor 220 may determine an authentication level. In this regard, the server processor 220 may receive information about a type of an application or a type of a function or service execution-requested by the application, from the electronic device 100. According to various embodiments, the server processor 220 may receive context information of the electronic device 100 and information about the execution-requested function or service type of the application. The server processor 220 may determine what authentication level the server processor 220 requests based on the received information. For example, the server processor 220 may be configured to request different authentication levels depending on at least one of the location of the electronic device 100, a current usage time, a type of a function execution-requested by an application, or an authentication history.

In operation 1307, the server processor 220 may transmit the appropriate authentication level to the electronic device 100. According to various embodiments, the server processor 220 may transmit information about at least one authentication method operable for each authentication level, to the electronic device 100. For example, the authentication level information may include setting information requesting the electronic device 100 to perform a face authentication method using at least one of the color camera sensor 180 or the iris sensor 130 associated with the first authentication level. Alternatively, the authentication level information may include setting information requesting the electronic device 100 to perform user authentication using at least one of the iris sensor 130 and the fingerprint sensor 190, in association with a second authentication level.

In operation 1309, the server processor 220 may receive authentication information from the electronic device 100. For example, the authentication information may include whether the execution of authentication is successful, or context information of a context in which the electronic device 100 performs authentication.

In operation 1311, the server processor 220 may process authentication and update the authentication information DB 233. For example, the server processor 220 may process the function of the execution-requested application depending on authentication success. According to an embodiment, the server processor 220 may provide account information or may process a transfer function or the like, in association with finance. According to an embodiment, the server processor 220 may update the authentication information DB 233 based on the context information of the electronic device 100 associated with the execution of authentication. For example, the server processor 220 may store and manage a history about whether the authentication of the electronic device 100 succeeds or fails in any context. For example, the server processor 220 may store and manage a history about what authentication method the electronic device 100 has adopted in any context. The server device 200 may determine an authentication level associated with the execution of the next authentication of the electronic device 100, based on the authentication information DB 233.

Figure 14:
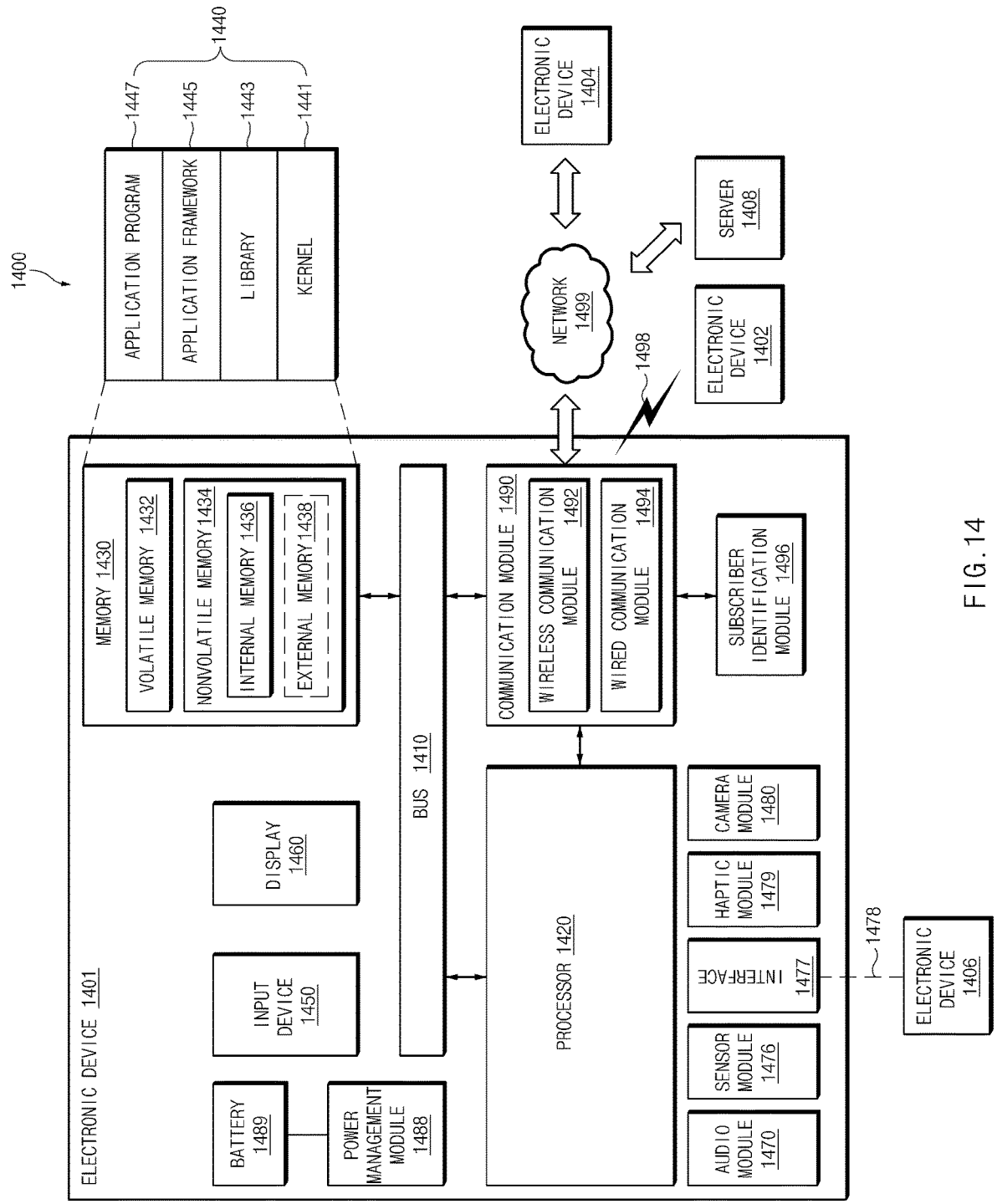
FIG. 14 illustrates an electronic device in a network environment, according to various embodiments.

FIG. 14 illustrates an electronic device 1401 in a network environment 1400, according to various embodiments.

Referring to FIG. 14, under the network environment 1400, the electronic device 1401 (e.g., an electronic device) may communicate with an electronic device 1402 through the first network (which may be a local wireless communication network) 1498 or may communication with an electronic device 1404 or a server 1408 (e.g., the server 200) through the second network 1499. According to an embodiment, the electronic device 1401 may communicate with the electronic device 1404 through the server 1408.

According to an embodiment, the electronic device 1401 may include a bus 1410, a processor 1420 (e.g., the processor 120) a memory 1430, an input device 1450 (e.g., a micro-phone or a mouse), a display 1460, an audio module 1470, a sensor module 1476, an interface 1477, a haptic module 1479, a camera module 1480, a power management module 1488, a battery 1489, a communication module 1490, and a subscriber identification module 1496. According to an embodiment, the electronic device 1401 may not include at least one (e.g., the display 1460 or the camera module 1480) of the above-described elements or may further include other element(s).

For example, the bus 1410 may interconnect the above-described elements 1420 to 1490 and may include a circuit for conveying signals (e.g., a control message or data) between the above-described elements. The processor 1420 may include one or more of a central processing unit (CPU), an application processor (AP), a graphic processing unit (GPU), an image signal processor (ISP) of a camera or a communication processor (CP). According to an embodiment, the processor 1420 may be implemented with a system on chip (SoC) or a system in package (SiP). For example, the processor 1420 may drive an operating system (OS) or an application to control at least one of another element (e.g., hardware or software element) connected to the processor 1420 and may process and compute various data. The processor 1420 may load a one or more instructions or data, which is received from at least one of other elements (e.g., the communication module 1490), into a volatile memory 1432 to process the one or more instructions or data and may store the process result data into a nonvolatile memory 1434.

The memory 1430 may include, for example, the volatile memory 1432 or the nonvolatile memory 1434. The volatile memory 1432 may include, for example, a random access memory (RAM) (e.g., a dynamic RAM (DRAM), a static RAM (SRAM), or a synchronous dynamic RAM (SDRAM)). The nonvolatile memory 1434 may include, for example, a one-time programmable read-only memory (OT-PROM), a programmable read-only memory (PROM), an erasable programmable read-only memory (EPROM), an electrically erasable programmable read-only memory (EE-PROM), a mask ROM, a flash ROM, a flash memory, a hard disk drive, or a solid-state drive (SSD). In addition, the nonvolatile memory 1434 may be configured in the form of an internal memory 1436 or the form of an external memory 1438 which is available through connection if desired, according to the connection with the electronic device 1401. The external memory 1438 may further include a flash drive such as compact flash (CF), secure digital (SD), micro secure digital (Micro-SD), mini secure digital (Mini-SD), extreme digital (xD), a multimedia card (MMC), or a memory stick. The external memory 1438 may be operatively or physically connected with the electronic device 1401 in a wired manner (e.g., a cable or a universal serial bus (USB)) or a wireless (e.g., Bluetooth) manner.

For example, the memory 1430 may store, for example, at least one different software element, such as an instruction or data associated with the program 1440, of the electronic device 1401. The program 1440 may include, for example, a kernel 1441, a library 1443, an application framework 1445 or an application program (interchangeably, "application") 1447.

The input device 1450 may include a microphone, a mouse, or a keyboard. According to an embodiment, the keyboard may include a keyboard physically connected or a keyboard virtually displayed through the display 1460.

The display 1460 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1401.

The audio module 1470 may convert, for example, from a sound into an electrical signal or from an electrical signal into the sound. According to an embodiment, the audio module 1470 may acquire sound through the input device 1450 (e.g., a microphone) or may output sound through an output device (not illustrated) (e.g., a speaker or a receiver) included in the electronic device 1401, an external electronic device (e.g., the electronic device 1402 (e.g., a wireless speaker or a wireless headphone)) or an electronic device 1406 (e.g., a wired speaker or a wired headphone) connected with the electronic device 1401

The sensor module 1476 may measure or detect, for example, an internal operating state (e.g., power or temperature) or an external environment state (e.g., an altitude, a humidity, or brightness) of the electronic device 1401 to generate an electrical signal or a data value corresponding to the information of the measured state or the detected state. The sensor module 1476 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 1476 may further include a control circuit for controlling at least one or more sensors included therein. According to an embodiment, the sensor module 1476 may be controlled by using the processor 1420 or a processor (e.g., a sensor hub) separate from the processor 1420. In the case that the separate processor (e.g., a sensor hub) is used, while the processor 1420 is in a sleep state, the separate processor may operate without awakening the processor 1420 to control at least a portion of the operation or the state of the sensor module 1476.

According to an embodiment, the interface 1477 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 1478 may physically connect the electronic device 1401 and the electronic device 1406. According to an embodiment, the connector 1478 may include, for example, an USB connector, an SD card/MMC connector, or an audio connector (e.g., a headphone connector).

The haptic module 1479 may convert an electrical signal into mechanical stimulation (e.g., vibration or motion) or into electrical stimulation. For example, the haptic module 1479 may apply tactile or kinesthetic stimulation to a user. The haptic module 1479 may include, for example, a motor, a piezoelectric element, or an electric stimulator.

The camera module 1480 may capture, for example, a still image and a moving picture. According to an embodiment, the camera module 1480 may include at least one lens (e.g., a wide-angle lens and a telephoto lens, or a front lens and a rear lens), an image sensor, an image signal processor, or a flash (e.g., a light emitting diode or a xenon lamp).

The power management module 1488, which is to manage the power of the electronic device 1401, may include at least a portion of a power management integrated circuit (PMIC).

The battery 1489 may include a primary cell, a secondary cell, or a fuel cell and may be recharged by an external power source to supply power at least one element of the electronic device 1401.

The communication module 1490 may establish a communication channel between the electronic device 1401 and an external device (e.g., the first external electronic device 1402, the second external electronic device 1404, or the server 1408). The communication module 1490 may support wired communication or wireless communication through the established communication channel. According to an embodiment, the communication module 1490 may include a wireless communication module 1492 or a wired communication module 1494. The communication module 1490 may communicate with the external device (e.g., the first external electronic device 1402, the second external electronic device 1404 or the server 1408) through a first network 1498 (e.g. a wireless local area network such as Bluetooth or infrared data association (IrDA)) or a second network 1499 (e.g., a wireless wide area network such as a cellular network) through a relevant module among the wireless communication module 1492 or the wired communication module 1494.

The wireless communication module 1492 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 1492 supports cellar communication, the wireless communication module 1492 may, for example, identify or authenticate the electronic device 1401 within a communication network using the subscriber identification module (e.g., a SIM card) 1496. According to an embodiment, the wireless communication module 1492 may include a communication processor (CP) separate from the processor 2820 (e.g., an application processor (AP). In this case, the communication processor may perform at least a portion of functions associated with at least one of elements 1410 to 1496 of the electronic device 1401 in substitute for the processor 1420 when the processor 1420 is in an inactive (sleep) state, and together with the processor 1420 when the processor 1420 is in an active state. According to an embodiment, the wireless communication module 1492 may include a plurality of communication modules, each supporting a relevant communication scheme among cellular communication, short-range wireless communication, or a GNSS communication scheme.

The wired communication module 1494 may include, for example, include a local area network (LAN) service, a power line communication, or a plain old telephone service (POTS).

For example, the first network 1498 may employ, for example, Wi-Fi direct or Bluetooth for transmitting or receiving instructions or data through wireless direct connection between the electronic device 1401 and the first external electronic device 1402. The second network 1499 may include a telecommunication network (e.g., a computer network such as a LAN or a WAN, the Internet or a telephone network) for transmitting or receiving instructions or data between the electronic device 1401 and the second electronic device 1404.

According to embodiments, the instructions or the data may be transmitted or received between the electronic device 1401 and the second external electronic device 1404 through the server 1408 connected with the second network. Each of the external first and second external electronic devices 1402 and 1404 may be a device of which the type is different from or the same as that of the electronic device 1401. According to various embodiments, all or a part of operations that the electronic device 1401 will perform may be executed by another or a plurality of electronic devices (e.g., the electronic devices 1402 and 1404 or the server 1408). According to an embodiment, in the case that the electronic device 1401 executes any function or service automatically or in response to a request, the electronic device 1401 may not perform the function or the service internally, but may alternatively or additionally transmit requests for at least a part of a function associated with the electronic device 1401 to any other device (e.g., the electronic device 1402 or 1404 or the server 1408). The other electronic device (e.g., the electronic device 1402 or 1404 or the server 1408) may execute the requested function or additional function and may transmit the execution result to the electronic device 1401. The electronic device 1401 may provide the requested function or service using the received result or may additionally process the received result to provide the requested function or service. To this end, for example, cloud computing, distributed computing, or client-server computing may be used.

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 1430) in the form of a program module. The instruction, when executed by a processor (e.g., a processor 1420), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or codes executable by an interpreter.

Each element (e.g., a module or a program module) according to various embodiments may be implemented as a single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   one or more biometric sensors, the one or more biometric sensors including a RGB camera and an Infra-Red (IR) camera;
   a memory configured to store an authentication setting table associated with one or more authentication methods associated with one or more authentication levels; and
   a processor operatively connected to the memory and the one or more biometric sensors, wherein the processor is configured to:
   receive authentication level information associated with a function executed by the electronic device;
   select at least one authentication method of the one or more authentication methods matching an authentication level indicated by the received authentication level information; and
   perform user authentication based on the selected at least one authentication method through the one or more biometric sensors,
   wherein the processor is further configured to:
      obtain external luminance of the electronic device by a sensor;
      when the external luminance is within a first luminance range corresponding to a daylight, the at least one authentication method is selected to perform the user authentication based on face recognition of a user through face image obtained by the RGB camera, wherein perform the user authentication comprises comparing the face image obtained by the RGB to another RGB facial image stored in the memory; and
      when the external luminance is within a second luminance range corresponding to a dark place, the at least one authentication method is selected to perform the user authentication based on face recognition of the user through face image obtained by the IR camera, wherein perform the user authentication comprises comparing the face image obtained by the IR camera to another IR facial image stored in the memory.

2. The electronic device of claim 1, wherein the processor is configured to:
   obtain context information including at least one of environmental information detected by the sensor included of the electronic device, device information associated with an operation of the electronic device, and function execution information obtained according to the operation of the electronic device; and
   wherein the at least one authentication method is selected based at least in part on the context information.

3. The electronic device of claim 2, wherein selecting the at least one authentication method further comprises:
   detecting a current location of the electronic device;
   when the current location of the electronic device is disposed within a specified first location range, selecting a first authentication method associated with a first authentication level from among the one or more authentication methods; and
   when the current location of the electronic device is disposed within a specified second location range, selecting a second authentication method associated with a second authentication level from among the one or more authentication methods.

4. The electronic device of claim 2, wherein selecting the at least one authentication method further comprises:
   detecting a current usage time of the electronic device;
   when the current usage time is within a first time range, selecting a first authentication method associated with a first authentication level from among the one or more authentication methods; and
   when the current usage time is within a second time range, select a second authentication method associated with a second authentication level from among the one or more authentication methods.

5. The electronic device of claim 2, wherein selecting the at least one authentication method further comprises:
   detecting a degree of external illuminance in an environment surrounding the electronic device;
   when an external illuminance is within a first illuminance range, select a first authentication method associated with a first authentication level, based on an image sensor operable in the first illuminance range; and
   when the external illuminance is within a second illuminance range, select a second authentication method associated with a second authentication level, based on an image sensor operable in the second illuminance range.

6. The electronic device of claim 2, wherein selecting the at least one authentication method further comprises:
   detecting a current battery level of the electronic device
   when the current battery level of the electronic device is greater than or equal to a first threshold value, select a first authentication method associated with a first authentication level; and when the current battery level of the electronic device is less than the first threshold value, select a second authentication method.

7. The electronic device of claim 2, wherein after detecting successful authentication, a first authentication level is set for a first predetermined time starting from a time of the successful authentication, and a second authentication level is set for a second predetermined time starting from lapse of the first predetermined time.

8. The electronic device of claim 2, wherein the processor is configured to:
display a list including entries selectable by the user to indicate at least one authentication method, from among the one or more authentication methods,
perform a specified authentication method when selected from the displayed list.

9. The electronic device of claim 2, further comprising:
a display,
wherein the processor is configured to:
output, on the display, guide information associated with at least one of a result of the performed authentication, and the context information.

10. The electronic device of claim 2, wherein the processor is configured to:
when user authentication is performed based on the selected at least one authentication method, transmit the context information to an external device based on a result of the user authentication.

11. An authentication method in an electronic device, the method comprising:
storing in memory an authentication method setting table in which one or more authentication methods are associated with one or more authentication levels;
receiving by a communication device authentication level information associated with a function executed by the electronic device;
based on the authentication method setting table, selecting at least one authentication method from among the one or more authentication methods based on an authentication level indicated by the received authentication level information; and
performing user authentication using the selected at least one authentication method through one or more biometric sensors of the electronic device,
wherein the performing comprises:
obtaining external luminance of the electronic device by a sensor
when the external luminance is within a first luminance range corresponding to a daylight, performing the user authentication based on face recognition of the user through face image obtained by a RGB camera, wherein perform the user authentication comprises comparing the face image obtained by the RGB to another RGB image stored in the memory; and
when the external luminance is within a second luminance range corresponding to a dark place, performing the user authentication based on face recognition of the user through face image obtained by a IR camera, wherein perform the user authentication comprises comparing the face image obtained by the IR camera to another IR image stored in the memory.

12. The method of claim 11, wherein selecting the at least one authentication method includes:
obtaining context information including at least one of environmental information detected by the sensor of the electronic device, device information associated with an operation of the electronic device, and function execution information obtained according to the operation of the electronic device; and
wherein the at least one authentication method is selected based at least in part on the context information.

13. The method of claim 12, wherein selecting the at least one authentication method further comprises: detecting a current location of the electronic device;
when the current location of the electronic device is disposed within a specified first location range, selecting a first authentication method associated with a first authentication level from among the one or more authentication methods; and
when the current location of the electronic device is disposed within a specified second location range, selecting a second authentication method associated with a second authentication level from among the one or more authentication methods.

14. The method of claim 12, wherein selecting the at least one authentication method further comprises:
detecting a current usage time of the electronic device;
when the current usage time is within a first time range, selecting a first authentication method associated with a first authentication level from among the one or more authentication methods; and
when the current usage time is within a second time range, select a second authentication method associated with a second authentication level from among the one or more authentication methods.

15. The method of claim 12, wherein selecting the at least one authentication method further comprises:
detecting a degree of external illuminance in an environment surrounding the electronic device;
when an external illuminance is within a first illuminance range, select a first authentication method associated with a first authentication level, based on an image sensor operable in the first illuminance range; and
when the external illuminance is within a second illuminance range, select a second authentication method associated with a second authentication level, based on an image sensor operable in the second illuminance range.

16. The method of claim 12, wherein selecting the at least one authentication method further comprises:
detecting a current battery level of the electronic device
when the current battery level of the electronic device is greater than or equal to a first threshold value, select a first authentication method associated with a first authentication level; and
when the current battery level of the electronic device is less than the first threshold value, select a second authentication method.

17. The method of claim 12, wherein after detecting successful authentication, the method further comprises setting a first authentication level for authentication for a first predetermined time starting from a time of the successful authentication, setting a second authentication level for authentication for a second predetermined time starting from lapse of the first predetermined time.

18. The method of claim 12, wherein the selecting includes:
displaying a list including entries selectable by a user to indicate at least one authentication method, from among the one or more authentication methods,
performing a specified authentication method when selected from the displayed list.

19. The method of claim 12, further comprising:
output, on a display, guide information associated with at least one of a result of the performed authentication, and the context information.

20. The method of claim 12, further comprising:
when user authentication is performed based on the selected at least one authentication method, transmitting the context information to an external device based on a result of the user authentication.

21. An electronic device comprising:
one or more biometric sensors, the one or more biometric sensors including a RGB camera and an Infra-Red (IR) camera;
a memory configured to store an authentication setting table associated with one or more authentication methods associated with one or more authentication levels; and
a processor operatively connected to the memory and the one or more biometric sensors, wherein the processor is configured to:
receive authentication level information associated with a function executed by the electronic device;
select at least one authentication method of the one or more authentication methods matching an authentication level indicated by the received authentication level information; and
perform user authentication based on the selected at least one authentication method through the one or more biometric sensors,
wherein the processor is configured to:
obtain external luminance of the electronic device by a sensor;
select one of the RGB camera or the IR camera, corresponding to the authentication level;
when the external luminance is within a first luminance range corresponding to a daylight, the at least one authentication method is selected to perform the user authentication based on face recognition of a user through face image obtained by the RGB camera; and
wherein when the RGB camera is selected, initializing a first memory, and when the IR camera is selected, initializing a second memory.

22. An authentication method in an electronic device, the method comprising:
storing in memory an authentication method setting table in which one or more authentication methods are associated with one or more authentication levels;
receiving by a communication device authentication level information associated with a function executed by the electronic device;
based on the authentication method setting table, selecting at least one authentication method from among the one or more authentication methods based on an authentication level indicated by the received authentication level information; and
performing user authentication using the selected at least one authentication method through one or more biometric sensors of the electronic device,
wherein the selecting at least one authentication method comprises:
selecting one of a RGB camera or a IR camera corresponding to the authentication level; and
wherein the performing comprises:
obtaining external luminance of the electronic device by a sensor;
selecting one of the RGB camera or the IR camera, corresponding to the authentication level;
when the external luminance is within a first luminance range corresponding to a daylight, the at least one authentication method is selected to perform the user authentication based on face recognition of a user through face image obtained by the RGB camera; and
when the external luminance is within a second luminance range corresponding to a dark place, selecting the at least one authentication method to perform the user authentication based on face recognition of the user through face image obtained by the IR camera; and
wherein when the RGB camera is selected, initializing a first memory, and when the IR camera is selected, initializing a second memory.

* * * * *